United States Patent [19]

Nomura et al.

[11] Patent Number: 5,519,533
[45] Date of Patent: May 21, 1996

[54] THREE-DIMENSIONAL INFORMATION REPRODUCING APPARATUS

[75] Inventors: Toshio Nomura, Yokkaichi; Masayuki Katagiri, Ikoma; Noritoshi Kako, Chiba, all of Japan

[73] Assignee: Sharp Kabushiki Kaisha, Osaka, Japan

[21] Appl. No.: 396,412

[22] Filed: Feb. 28, 1995

[30] Foreign Application Priority Data

Mar. 8, 1994 [JP] Japan .................................. 6-037338
May 20, 1994 [JP] Japan .................................. 6-106801

[51] Int. Cl.$^6$ .......................... G02B 27/42; G02B 27/22; G09G 3/00; G09G 5/02
[52] U.S. Cl. .......................... 359/478; 345/32; 345/151; 359/559
[58] Field of Search .................. 359/29, 64, 68, 359/463, 559, 560, 561, 478, 479; 345/32, 151

[56] References Cited

U.S. PATENT DOCUMENTS

| | | | |
|---|---|---|---|
| 3,085,469 | 4/1963 | Carlson | 359/559 |
| 3,703,640 | 11/1972 | Broussaud et al. | |
| 3,884,553 | 5/1975 | Graser, Jr. | 359/559 |
| 4,003,634 | 1/1977 | Graser, Jr. et al. | 359/559 |
| 4,461,541 | 7/1984 | Duthie | 359/559 |
| 4,541,691 | 9/1985 | Buzak | 359/64 |
| 4,635,051 | 1/1987 | Bos | 359/64 |
| 4,953,953 | 9/1990 | Fergason | 359/68 |
| 5,111,314 | 5/1992 | Leib | 359/559 |
| 5,132,839 | 7/1992 | Travis | 359/463 |
| 5,223,962 | 6/1993 | Shioji et al. | 359/68 |
| 5,317,437 | 5/1994 | Katakura | 359/68 |
| 5,317,651 | 5/1994 | Refregier et al. | 359/29 |

FOREIGN PATENT DOCUMENTS 1-254092 10/1989 Japan.
1-191838 7/1993 Japan.

OTHER PUBLICATIONS

"New Three–Dimensional Image Display System by Integral Photography", *Optics*, 1994, vol. 23, No. 7, pp. 422–423.

*Primary Examiner*—Martin Lerner
*Attorney, Agent, or Firm*—David G. Conlin; Kevin J. Fournier

[57] ABSTRACT

There is reproduced a three-dimensional image in which there is no dimness or no cross talk and which is light and high in resolution, by a three-dimensional information reproducing apparatus comprising a liquid crystal panel for displaying a discrete Fourier transform image, a light source array which is disposed to the rear of the liquid crystal panel and which emits parallel light, and a synchronous control device for switching, with time division, the discrete Fourier transform image that is displayed in the liquid crystal panel and also an angle of the parallel light that is emitted from the source light array. No color dislocation occurs in a reproduced image, resolution is enhanced, and a light three-dimensional image is reproduced, by a three-dimensional information reproducing apparatus comprising a liquid crystal panel for displaying with time division a discrete Fourier transform image resolved into color components, an illumination device for changing a color of emitted light with time division, and a synchronous control device for synchronizing and switching the image that is displayed on the liquid crystal panel, and the color of the illumination device.

13 Claims, 40 Drawing Sheets

| 1 | 2 | 3 | 4 | 5 | 6 | 7 | 8 | 9 | 10 | 11 | 12 |
|---|---|---|---|---|---|---|---|---|----|----|----|
| 13 | | | | | | | | | | | 24 |
| 25 | | | | | | | | | | | 36 |
| 37 | 38 | 39 | 40 | 41 | 42 | 43 | 44 | 45 | 46 | 47 | 48 |

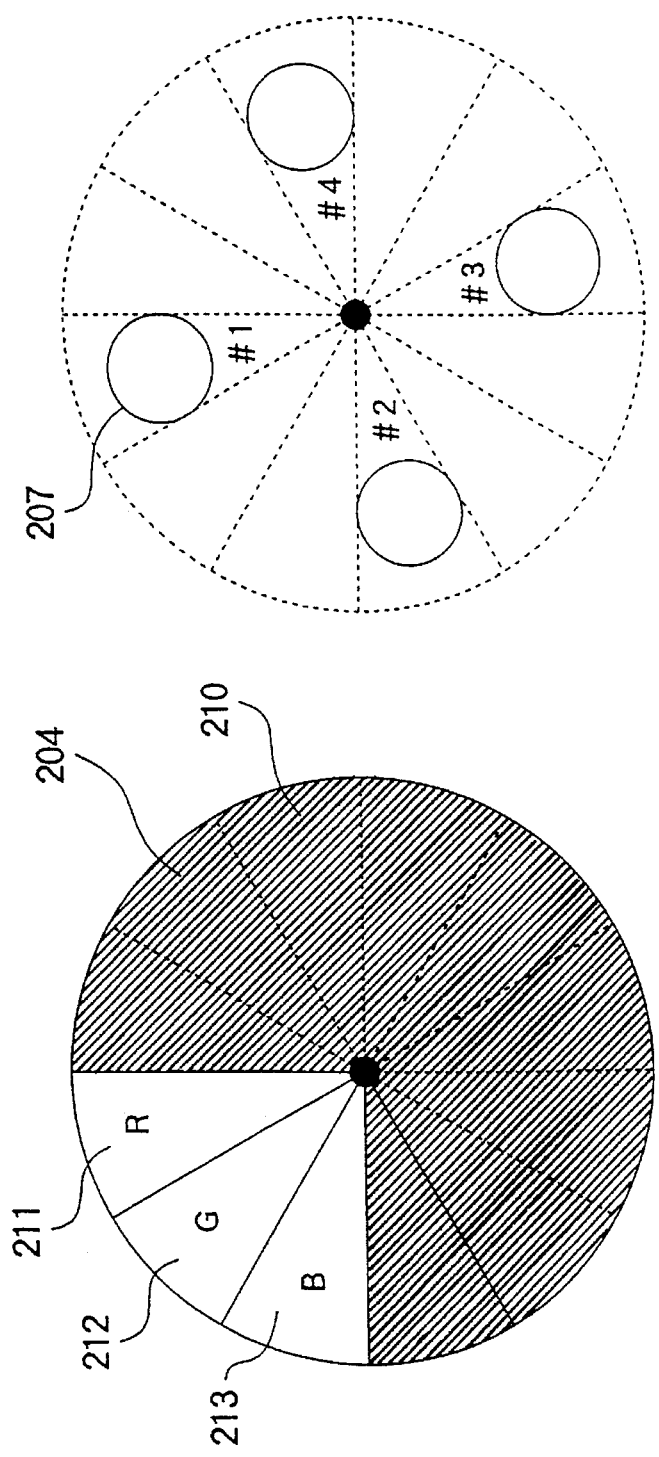
FIG. 44
FIG. 43
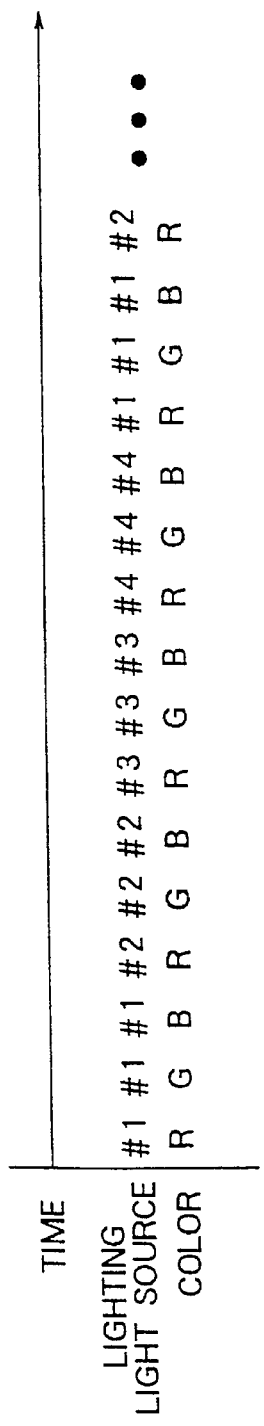
FIG. 45

THREE-DIMENSIONAL INFORMATION REPRODUCING APPARATUS

BACKGROUND OF THE INVENTION

1. Field of the Invention

The present invention relates to a three-dimensional information reproducing apparatus which inputs three-dimensional information and can reproduce a three-dimensional image without the need of special spectacles.

2. Description of the Related Art

Up to this time, there is known a three-dimensional information reproducing apparatus of the integral photographic type which inputs the state of a light beam traveling through a three-dimensional space, such as the traveling direction, and reproduces the traveling direction of a light beam. The three-dimensional information apparatus of the integral photographic type combines a pinhole array and photographic technique and has been applied as stereoscopic photography.

There is known a three-dimensional information reproducing apparatus using an image display device capable of displaying a dynamic picture image such as a liquid crystal panel instead of the photosensitive film in photography. This three-dimensional information apparatus is comprised of a liquid crystal panel 1 for displaying an image, a pinhole array panel 2 arranged in front of the liquid crystal panel 1, a diffusion plate 3 arranged in rear of the liquid crystal panel 1 for diffusing light, and a light source 4 for irradiating the diffusion plate 3 with light, as shown in FIG. 1. As shown in FIG. 2, a plurality of pinholes 5 are bored in the pinhole array panel 2 in the vertical and horizontal directions at pitch-P intervals. A plurality of pixels are spatially determined and two-dimensionally arranged on the liquid crystal panel 1, corresponding to the respective pinholes 5. To the liquid crystal panel 1 and the pinhole array panel 2 there is connected a synchronous control circuit 8.

Next, the principles of the reproduction of a three-dimensional image in the conventional three-dimensional information reproducing apparatus shown in FIG. 1 will be described with FIG. 3. In the FIG. 3, a pixel block 6 of 4×4 (=16) pixels is assigned to each of the pinholes 5a, 5b, 5c . . . on the pinhole array panel 2. Part of light radiated from some pixel block 6 on the liquid crystal panel 1 travels in a direction that is determined by the spatial position of the pinhole 5 corresponding to that pixel block 6. Light beams in various directions are reproduced by a combination of the pixel block 6 and the position of the pinhole 5, so a spatial image is formed in an observation space by a group of light beams emitted from a plurality of pinholes 5. In the example of FIG. 3, light beams radiated from an object S in plural directions have been reproduced.

Light from the object S is originally scattered in all directions, and the pinhole 5 has a function of sampling the light scattering from the object 5 in all directions. Therefore, if the number of the pinholes 5 are increased, the reproducibility of light beams will be increased. It is needless to say that a continuous body to be photographed can be reproduced by arranging a plurality of the pinholes 5.

If an observer 100 perceives a light beam emitted from the pinhole 5 by his or her eyes, three-dimensional information of the object S will be recognized. That is, the object S is recognized as a three-dimensional image. In the three-dimensional information reproducing apparatus of the type in which a light-beam state such as this is reproduced, special spectacles are unnecessary, the observation position is not limited extremely like a so-called lenticular method, and a plurality of people can observe a reproduced picture image at the same time. There is the advantage that if a visual point is moved, then an image to be observed will be changed according to the movement of the visual point. The factor that recognizes a reproduced picture image as a three-dimensional image is not only binocular parallax, but also the factor is that the distance feeling of a reproduced picture image, i.e., three-dimensional feeling is recognized by the focussing function of eyes. Therefore, there is a little fatigue feeling at the time of observation, a more natural three-dimensional image can be observed, and three-dimensional information can be recognized even by one eye.

A three-dimensional information inputting method that is displayed in the three-dimensional information apparatus shown in FIGS. 1 and 3 will be described making reference to FIG. 4.

A picture image of one picture screen that is displayed is not photographed at a time, but small portions of a picture image are photographed in order. A video camera lens 7 is parallel moved up, down, right and left at same intervals as the pinhole pitch P of the pinhole array panel 2 shown in FIG. 3, and photographing is performed at positions corresponding to the respective pinholes 5. The intersecting points of a line group in FIG. 4 correspond to the positions of the pinholes 5 in FIG. 3, respectively, and a picture image is photographed at a position that the center of the video camera lens 7 becomes equal to the intersecting point of the above-described line group, so picture images are photographed by the number of pinholes.

In FIG. 3 the pixel block 6 of 4×4 (=16) pixels on the liquid crystal panel 1 is assigned to one pinhole 5 on the panel 2. Therefore, for a picture image that is obtained with the method shown in FIG. 4 by a camera located at the pinhole position, only 16 pixels of 4×4 become necessary at the central portion of the camera, as shown in FIG. 5. Note that a circle shown by a dotted line represents the range of a picture image that is photographed by the above-described lens 7.

If 16 pixels photographed and extracted are numbered from 1 to 16, as shown in FIG. 5, they need to be rearranged in displaying them on the liquid crystal panel 1, as shown in FIG. 6. This is because an image in which the depth side and this side are inverted in the depth direction will be reproduced if the pixels shown in FIG. 5 are displayed as they are. The right image can be reproduced by rearranging each pixel, as shown in FIG. 6. This rearranging process must be performed for the photographing position of the video camera, i.e., the position corresponding to the pinhole. The pixel 6 on the liquid crystal panel 1 consists of three subpixels 8 (R (red), G (green), and B (blue) subpixels) arranged in the horizontal direction, as shown in FIG. 7B. In the above-described three-dimensional information reproducing apparatus, the emission direction of a reproduced light is determined by the pinhole 5 and the relative position of the pixel 6 corresponding to the pinhole 5, so the emission direction of the reproduced light will be different if the position of the pixel is different. The reproduced light beams emitted from the respective pixels 6 pass through the pinholes 5 and travel in different directions.

As described above, in the three-dimensional information reproducing apparatus of this type, the number of pinholes is preferable to be increased. In order to realize this, a case where the pinhole array panel in FIG. 2 is constituted by an optical shutter such as a liquid crystal panel is disclosed in Japanese Patent Laid-open Publication No. 5-191838. When the pinhole array panel is constituted by a plastic material, etc, the position of the pinhole is fixed, but when the pinhole array panel is constituted by an optical shutter such as a liquid crystal panel, it is possible to freely change the position of the pinhole. Therefore, time division display of a three-dimensional image is performed by synchronizing the position of a pinhole and a display image corresponding to that and changing them at high speeds, so it is possible to enhance practical resolution.

The feature of the case where the pinhole array is constituted by an optical shutter such as a liquid crystal panel is in that the position of the pinhole array is varied with time, but in this embodiment a case where during one cycle the position of the pinhole changed to four kinds of two horizontal positions×two vertical positions will be described in accordance with FIGS. 8A to 8D. A dotted line in the figures is written so that the pinhole positions can easily be compared, and does not have special meanings. If it is assumed that the pinhole 5 is located in the upper left-hand corner of a lattice formed by the dotted lines, as shown in FIG. 8A, the position of the pinhole 5 will be changed at the next time so that the pinhole 5 is located in the upper right-hand corner of the lattice formed by the dotted lines, as shown in FIG. 8B. At this time, the position of the pinhole 5 shown in FIG. 8B is located at the horizontal central position between two adjacent pinholes 5 shown in FIG. 8A. At the next time, the position of the pinhole 5 is changed so that the pinhole 5 is located in the lower right-hand corner of the lattice formed by the dotted lines, as shown in FIG. 8C. At this time, the position of the pinhole 5 shown in FIG. 8C is located at the vertical central position between two adjacent pinholes 5 shown in FIG. 8A. At the next time, the position of the pinhole 5 is changed so that the pinhole 5 is located in the lower right-hand corner of the lattice formed by the dotted lines, as shown in FIG. 8D. The states from FIG. 8A to FIG. 8D are repeated in this way, and time division display of a three-dimensional image is so performed as to correspond to the respective pinhole positions, by switching a picture image that will be displayed on the liquid crystal panel in synchronization with the respective pinhole positions.

Next, the reproduction state of a light beam at this time will be described with FIGS. 9A and 9B.

The display pixels on the liquid crystal panel 1 are numbered from 1 to 14 in the horizontal direction. As shown in FIG. 9A, a pinhole A corresponds to the pixels 4 to 7 and a pinhole B corresponds to the pixels 8 to 11. If the pinhole position is changed as shown in FIG. 9B, the state of reproduction of light beams will also change according to the change of the pinhole position, the pinhole A will correspond to the display pixels 2 to 5, and the pinhole B will correspond to the display pixels 8 to 9.

A conventional three-dimensional information reproduction apparatus is constructed as described above, and consequently, in the case of a three-dimensional information reproducing apparatus constructed by the liquid crystal panel 1 in which pixels 6 of red, green, and blue are arranged in different positions on a plane, the pinhole array panel 2, etc., the emission direction of a reproduced light beam is determined by the pinhole and the relative position of the pixel of the liquid crystal panel corresponding to the pinhole, so the emission direction of the reproduced light beam is different for different colors and color dislocation will occur in the reproduced image, by a difference in the positions of the color filters arranged. Since the reproduced light beams emitted from each pixel travel through the pinholes in different directions, an observer observing these light beams cannot see a three-dimensional image of the right color.

The pinhole array panel and a slit array panel transmit only part of light emitted from the liquid crystal panel and interrupt most of the remaining light, so the efficiency of utilization of light is extremely low and a picture image that will be reproduced becomes dark. Particularly when the pinhole array is used, the darkness of a picture image that will be reproduced is remarkable and the observation of a reproduced picture image is difficult under a room illumination light.

The resolution of a reproduced picture image depends upon the number of pinholes and the number of pixels of a liquid crystal panel corresponding to one pinhole. Since the total number of pixels of the liquid crystal panel is limited, there is the relationship that if one of the number of pinholes and the number of pixels of the liquid crystal panel corresponding to one pinhole is increased, the other will be decreased, so it is difficult to obtain a reproduced image which is high in resolution. In a conventional apparatus in which the pinhole array was constituted not by a plastic material but by an optical shutter such as a liquid crystal panel, a reproduced image that is high in resolution can be obtained by moving the position of the optical shutter with time division, but since the emission direction of a reproduced light beam is determined by the optical shutter and the relative position of the pixel of the liquid crystal panel corresponding to the optical shutter, the emission direction of the reproduced light beam is different by a different in colors and color dislocation will occur in the reproduced image, by a difference in the positions of the color filters arranged. Further, the optical shutter transmits only part of light emitted from a liquid crystal panel and interrupts most of the remaining light, so the efficiency of utilization of light is extremely low and only a dark picture image can be reproduced. These problems are a great obstacle to observation, and in an extreme case, binocular vision itself becomes impossible.

Since the display pixel and the pinhole have a finite size, the emitted light from the pinhole spreads out and a reproduced image becomes obscure. The pinhole is ideally an infinitely small bore, but in a case where the pinhole is constituted by an optical shutter such as a liquid crystal panel, the size of the pinhole cannot be reduced to less than the pixel size of the liquid crystal panel. Therefore, the light emitted from the pinhole, as shown in FIG. 10, spreads out in proportion to the distance from the pinhole, so a reproduced image becomes dim.

Since the pinhole has a finite size, the cross talk of reproduced light will occur. As shown in FIG. 10, the light emitted from the pinhole 5 spreads out in proportion to the distance from the pinhole, and consequently, the emission light from the pixel 1 and the emission light from the pixel 2 are mixed in the portion indicated by oblique lines in the figure, so a recorded light beam cannot be reproduced.

The foregoing is put together and shown in Table 1. Note that the kind of the three-dimensional information reproducing apparatus is limited to a method of reproducing the state of a light beam.

TABLE 1

| Kind of three-dimensional reproducing apparatus (using a dynamic picture display panel) | Pinhole array | Multiple lens in the form of a fly's eye | Plural-pinhole time division movement | Single-slit time division movement |

TABLE 1-continued

| | | | | |
|---|---|---|---|---|
| Color dislocation occurs due to the arrangement of R, G, and B | Occur | Occur | Occur | Occur |
| Image becomes dark due to the interruption of a light beam | Very dark | Light | Very dark | Dark |
| Degree of deterioration in resolution (as compared with two-dimensional display) | Large | Large | Relatively small | Relatively small |
| Direction of parallax | Horizontality and verticality | Horizontality and verticality | Horizontality and verticality | Only horizontality |

SUMMARY OF THE INVENTION

It is, accordingly, an important object of the present invention to provide a three-dimensional information reproducing apparatus in which no dimness or no cross talk takes place and which is capable of reproducing a three-dimensional image that is light and high in resolution.

Another important object of the present invention is to provide a three-dimensional information reproducing apparatus in which no color dislocation occurs in a reproduced image and which is capable of reproducing a light picture image and also capable of suppressing, as compared with two-dimensional display, a deterioration in resolution.

These objects and other objects are achieved in accordance with one important aspect of the present invention by providing a three-dimensional information reproducing apparatus which comprises image display means for displaying a discrete Fourier transform image, illumination means which is disposed to the rear of said image display means and which emits parallel light, and synchronous control means for switching, with time division, the discrete Fourier transform image that is displayed in said image display means and also an angle of the parallel light that is emitted from said illumination means.

In the three-dimensional information reproducing apparatus, the discrete Fourier transform is displayed by the image display means, parallel light is radiated by the illumination means, and the discrete Fourier transform image that is displayed on said image display means and also the angle of the parallel light that is radiated from said illumination means are switched with time division by said synchronous control means. Therefore, since a screen such as a pinhole is not needed, light can effectively be utilized and a light three-dimensional image can be reproduced. In addition, since parallel light is used as illumination light, light that was transmitted through a liquid crystal panel does not spread out, a reproduced image becomes clear without becoming dim, light beams emitted from adjacent display pixels do not cross each other, and a three-dimensional image with no cross talk can be reproduced.

It is preferable that said illumination means be comprised of a light source array consisting of a plurality of light sources for emitting light, and a single lens for transforming the light emitted from said light source array into parallel light.

According to this constitution, high response is possible by selecting with time division a light source that is lit, because mechanical movement is not needed in changing the emitted angle of the illumination light beam.

It is preferable that said illumination means be comprised of a single light source for emitting light, light source moving means for moving said light source in a right-angle direction with respect to an optic axis, and a single lens for transforming said light emitted from said light source into parallel light.

According to this constitution, since, by controlling the direction of a reproduced light beam by the amount of dislocation of a light beam from an optic axis, the direction of a light beam that can be reproduced is determined by the amount of movement of the light source, the number of pixels on a liquid crystal panel corresponding to one imaginary slit can be altered easily and changed in infinite steps within a range of the amount of movement of the light source.

Said illumination means is preferable to be comprised of a light source array consisting of a plurality of light sources for emitting light, light source array moving means for moving said light source array in a right-angle direction with respect to an optic axis, and a lens array consisting of a plurality of lenses for transforming said light emitted from said light source array into parallel light.

According to this constitution, since, by dividing an illumination space by a combination of a corresponding light source and lens, the direction of a light beam that can be reproduced is determined by the amount of movement of the light source, the number of pixels on a liquid crystal panel corresponding to one imaginary slit can be altered easily and changed in infinite steps within a range of the amount of movement of the light source. Moreover, the amount of movement of the light source can be made small and also the respective cylindrical lenses can be made small, so the influence of aberration becomes small.

It is preferable that said image display means comprise a plurality of image display means and said illumination means comprise a plurality of illumination means.

According to this constitution, since a display image is distributed to a plurality of image display means, the speed at which the display image is switched with time division can be slow. This constitution is effective when the response speed of the liquid crystal panel is not high. Therefore, the display time per one synthesized image can be made longer, and a three-dimensional image that is reproduced becomes lighter. If the speed at which the display image is switched is the same, there will be obtained a three-dimensional image of high resolution.

The foregoing objects are also achieved in accordance with another important aspect of the present invention by providing a three-dimensional information reproducing apparatus which comprises image display means for displaying with time division a discrete Fourier transform image resolved into color components, optical means disposed to the front of said image display means and having discrete Fourier transform operation at least in a horizontal direction, illumination means which is disposed to the rear of said image display means and which radiates emitted light whose color varies with time division to said image display means, and synchronous control means which is connected to said image display means and said illumination means and which switches a color of illumination light that is radiated from said illumination means, and also switches the said discrete Fourier transform image resolved into color components that is displayed by said image display means, synchronizing said discrete Fourier transform image with said color of illumination light.

According to this three-dimensional information reproducing apparatus, the discrete Fourier transform image resolved into color components is displayed with time division by the image display means, the emitted light whose color varies with time division is radiated to said image display means by the illumination means, and the display image resolved into color components that is displayed on the image display means and the color of the illumination light that is radiated from the illumination means are synchronized and switched by the synchronous control means. A space image is formed by reproducing the discrete Fourier transform image by the optical means. Since the discrete Fourier transform image is resolved into color components and displayed, no color dislocation occur in the reproduced image. The display image resolved into color components and the color of the illumination light are synchronized and switched, so the resolution of the reproduced image is enhanced and also a light image can be obtained.

The optical means is preferable to be comprised of a two-dimensional array of pinholes. With this, the manufacture and installation of the optical means become easy.

The optical means is preferable to be comprised of a two-dimensional lens array. With this, the light from the image display means is not screened, so there can be obtained a reproduced image that is very light.

The optical means is preferable to be comprised of a one-dimensional array of slits. With this, a simple three-dimensional information having three-dimensional information only in a horizontal direction can be reproduced, and the manufacture and installation of the optical means become easy.

The optical means is preferable to be comprised of a one-dimensional array of cylindrical lens. With this, a simple three-dimensional information having three-dimensional information only in a horizontal direction can be reproduced, the light from the image display means is not screened, a very light reproduction image can be obtained, and the manufacture and installation of the optical means become easy.

The illumination means is preferable to be comprised of a rotational color filter and a white light source. With this, a color image can be simply reproduced and also the manufacture and installation of the illumination means become easy.

The illumination means is preferable to be comprised of a light source of three colors. With this, a color image can be simply reproduced and also the manufacture and installation of the illumination means become easy.

The illumination means is preferable to be comprised of a liquid crystal panel, a polarizing plate, and a white light source. With this, a color image can be simply reproduced and also the illumination means can be made thin.

BRIEF DESCRIPTION OF THE DRAWINGS

Further object and advantages of the present invention will become apparent from the following description of the preferred embodiment of the invention as illustrated in the accompanying drawings wherein:

FIG. 43 is a diagram showing the rotary color filter of the embodiment of FIG. 42;

FIG. 44 is a diagram showing the arrangement of the optical fiber of the embodiment of FIG. 42; and FIG. 45 is a diagram used to explain the change of the color of the emitted light with time in the embodiment of FIG. 42.

DESCRIPTION OF THE PREFERRED EMBODIMENTS

A first embodiment of a three-dimensional information reproducing apparatus of the present invention will hereinafter be described making reference to FIG. 11.

Figure 11:
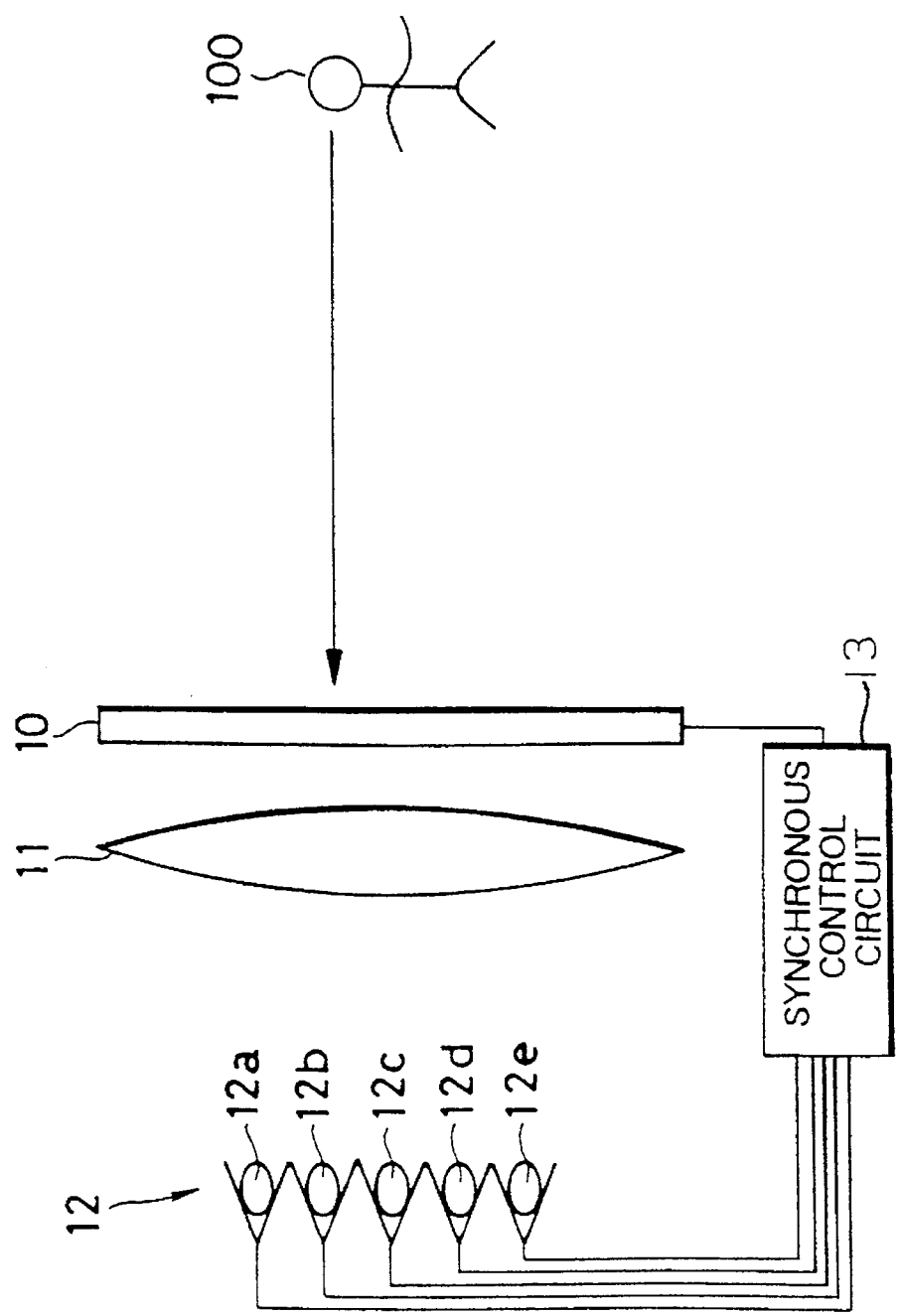
FIG. 11 is a diagram used to explain a first embodiment of a three-dimensional information reproducing apparatus of the present invention.

The three-dimensional information reproducing apparatus of this embodiment, as shown in FIG. 11, comprises a liquid crystal panel 10 as image display means for displaying a discrete Fourier transform image with time division, a cylindrical lens 11 arranged to the rear of the liquid crystal panel 10 and having a curvature in the horizontal direction, a light source array 12 arranged in a position away from the rear of the cylindrical lens 11 by a distance equal to the focal distance of the lens 11, the lens 11 and array 12 serving as illumination means, and a synchronous control circuit 13 as synchronous control means for switching, with time division, the discrete Fourier transform image that is displayed on the liquid crystal panel 10 and also the angle of the light beam emitted from the light source array 12 and transformed into parallel light by the cylindrical lens 11.

Figure 12B:
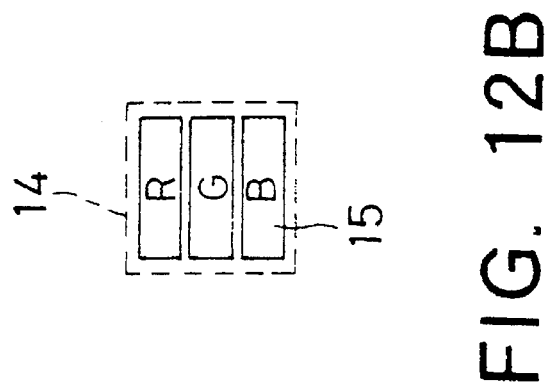
FIGS. 12A and 12B are diagrams showing the constitution of the pixels of the liquid crystal panel in the embodiment of FIG. 11.
Figure 12A:
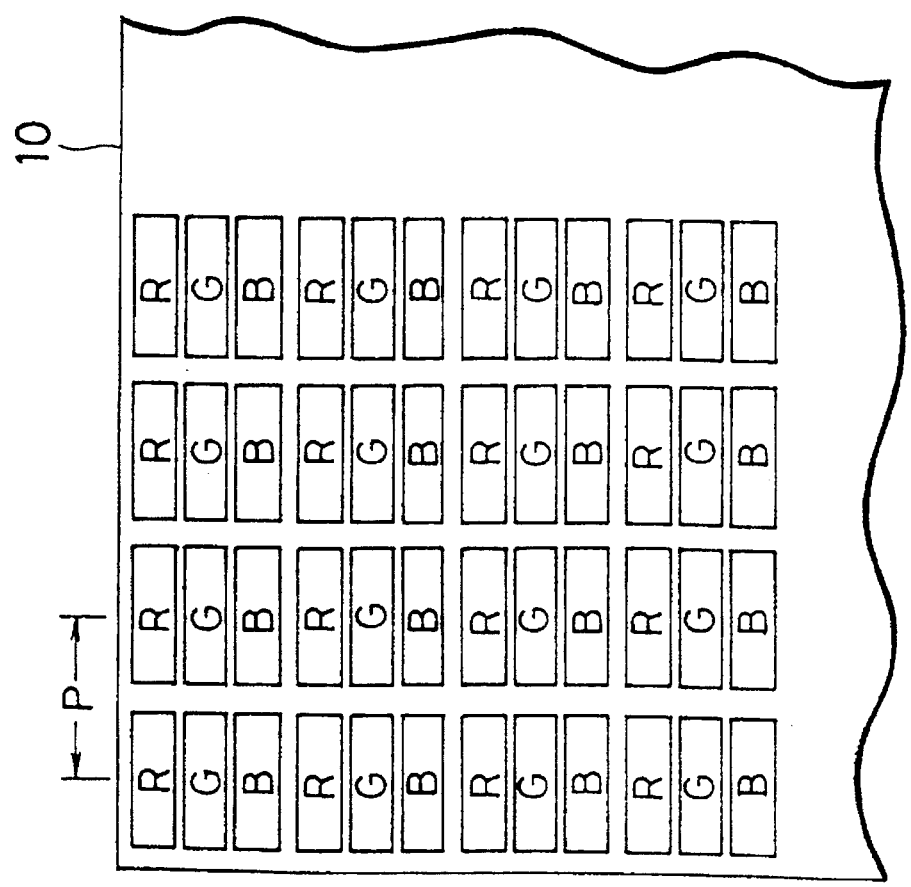

As clearly shown in FIGS. 12A and 12B, one display pixel 14 on the liquid crystal panel 10 consists of R (red), G (green), and B (blue) subpixels 15, and the R, G, and B subpixels 15 are arranged in the vertical direction. The display surface of the liquid crystal panel 10 is formed by two-dimensionally arranging these display pixels 14 at intervals of a pitch P. Note that a normal liquid crystal panel in which R, G, and B color filters are arranged in the horizontal direction may be rotated 90 degrees and used.

Next, the operation of this embodiment will be described.

Figure 13:
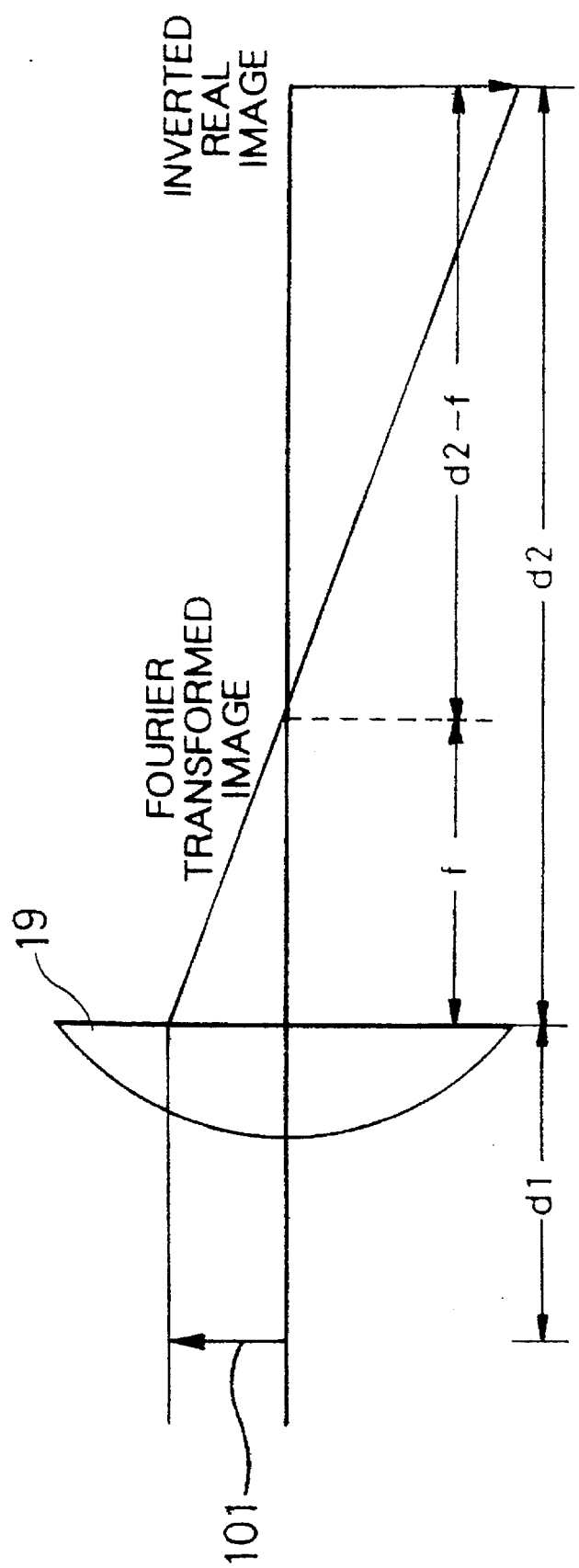
FIG. 13 is a diagram used to explain a method of recording a Fourier transform image.

First, a method of recording a Fourier transform image will be described making reference to FIG. 13. When an object 101 is placed a predetermined distance d1 to the front of a lens 19 with a focal distance of f, an image formed a focal distance f to the rear of the leans 19 becomes a Fourier transform image. In an image pick-up sensor, such as a photosensitive film or a CCD (charge coupled device) of a three-dimensional information reproducing apparatus which is arranged in the position of a focal distance f, only the intensity of light is recorded and the phase is rejected. Therefore, on that image pick-up sensor there is recorded a Fourier transform image in which the phase has been rejected. The Fourier transform image in which the phase has been rejected is intended to mean an image in which the incidence angle of a light beam to the lens 19 was transformed, on the image pick-up surface of the image pick-up sensor placed a focal distance f to the rear of the lens 19, into a distance from an optic axis. The real image of the object 101 positioned a predetermined distance d1 to the front of the lens 19 with a focal distance of f is formed a predetermined distance d2 to the rear of the lens 19, and in a two-dimensional information input device such as a normal camera which does not reproduce the state of a light beam, the image pick-up surface is positioned a predetermined distance d2 to the rear of the lens. The relationship between the focal distance f and the predetermined distances d1, d2 is given by the following equation.

$$1/d1+1/d2=1/f$$

Figure 14:
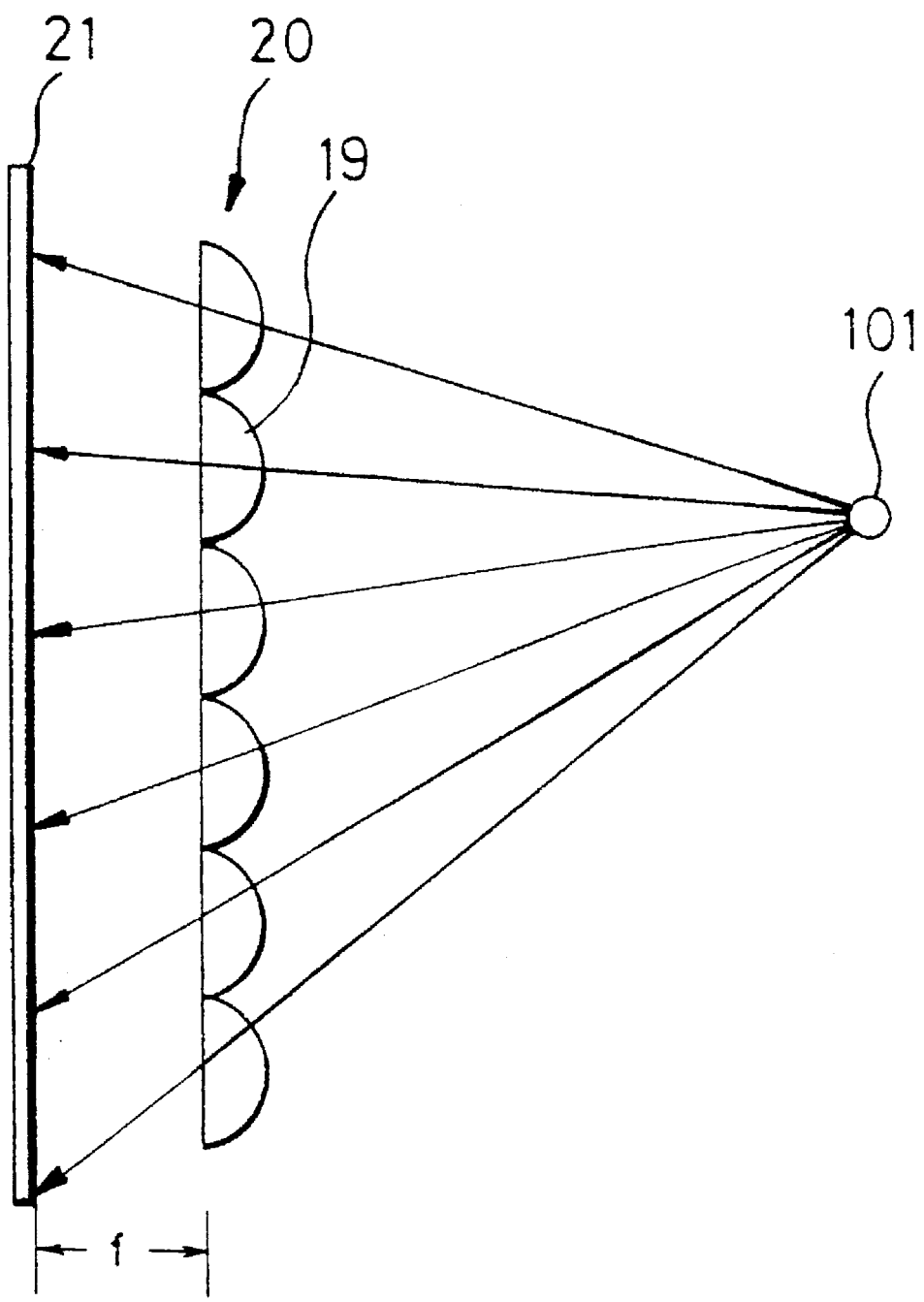
FIG. 14 is a diagram showing a case where the Fourier transform image is inputted by a lens array.

While the above-described operation of the Fourier transform of the three-dimensional input device has been described with reference to one lens, it is necessary, as shown in FIG. 14, that in order to actually input a discrete Fourier transform image, a two-dimensional lens array 20 in which a plurality of lens 19 are two-dimensionally arranged is used and the Fourier transform is performed for each lens 19. The discrete Fourier transform image sampled by the above-described lens array 20 is recorded on the image pick-up surface of an image pick-up sensor 21.

Figure 15:
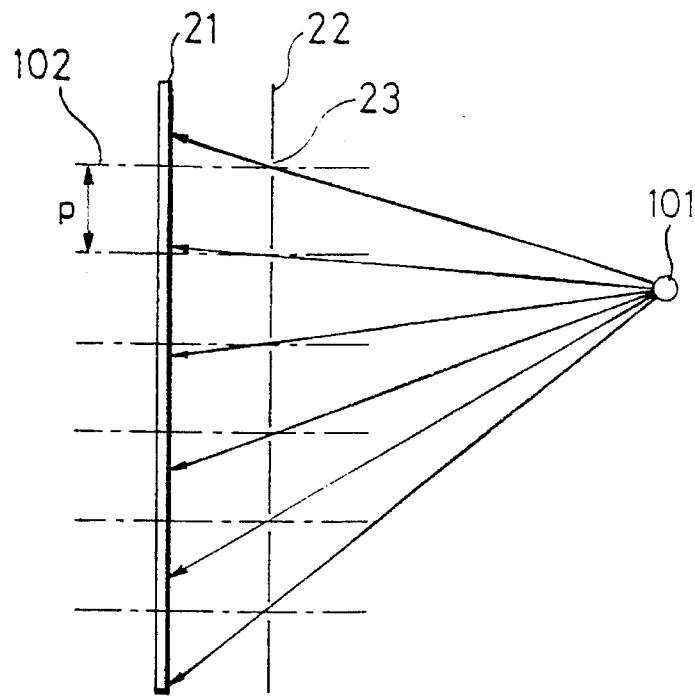
FIG. 15 is a diagram showing a case where the Fourier transform image is inputted by a pinhole array.
Figure 16:
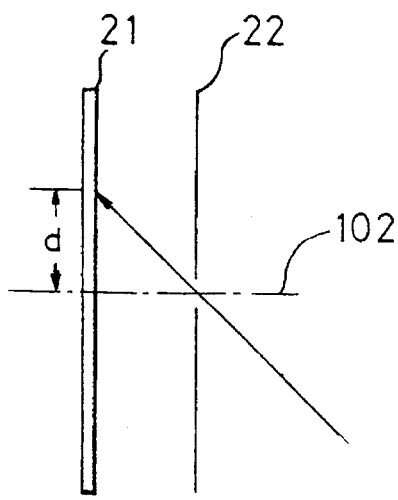
FIG. 16 is a diagram showing a case where the Fourier transform image is inputted by one pinhole.

The above-described two-dimensional lens array 20 of the input device is replaced with a pinhole array panel 22, as shown in FIG. 15. As shown in FIG. 16, a pinhole 23 does not have the conception of the focus, but it has an operation of passing the incidence angle of a light beam to the pinhole 23 through the optical axis on the image pick-up surface of the image pick-up sensor 21, i.e., the pinhole 23 and also transforming the incidence angle into a distance from an axis 102 vertical to the hole array panel 22, i.e., a Fourier transform operation, so a Fourier transform image on the image pick-up surface of the image pick-up sensor 21 and a real image become the same. Therefore, as shown in FIG.

15, the Fourier transform image is recorded on the image pick-up surface of the image pick-up sensor 21 by arranging the panel 22 to the front of the image pick-up sensor 21. The space between the image pick-up sensor 21 and the panel 22 is determined so that the Fourier transform images by the pinholes 23 are not overlapped on the image pick-up surface of the image pick-up sensor 21, and can freely be determined according to a recording range of light beams, i.e., a range of incidence angles.

If means for obtaining a discrete Fourier transform image is put together, it will become as shown in Table 2.

TABLE 2

| Sampling direction | Discrete Fourier transform means (image pick-up means) | Transform means and distance of image pick-up surface |
|---|---|---|
| Two dimension (horizontality and verticality) | Two-dimensional lens array (fly's eye lens) | Focal distance $f$ |
|  | Two-dimensional pinhole array | Arbitrary distance |
| One dimension (only verticality) | Cylindrical lens array (lenticular lens) | Focal distance $f$ |
|  | Slit array | Arbitrary distance |

Figure 17:
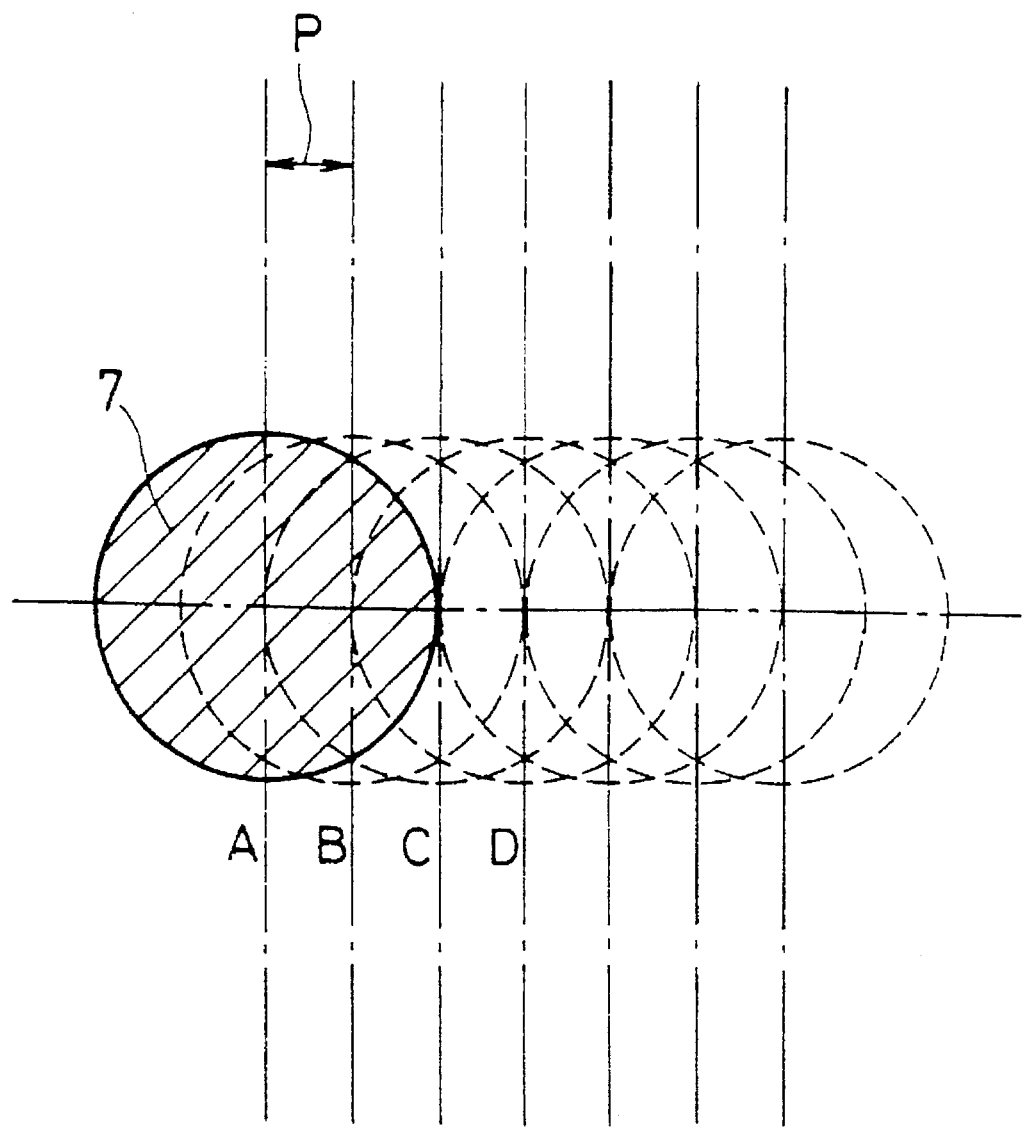
FIG. 17 is a diagram used to explain a method of inputting a discrete Fourier transform image by a slit array.

Next, a method of actually inputting a discrete Fourier transform image will be described with FIG. 17.

In this method, an imaginary slit array is assumed to be positioned to the front of an image pick-up surface, and images are sampled only in the horizontal direction and continuously recorded in the vertical direction, by photographing the images in order for each imaginary slit position. In an example of FIG. 17, a picture image of one picture screen is not photographed at a time, but small portions of a picture image are photographed in order. The photographing is performed in a parallel manner, by moving a video camera lens 7 right and left at the same intervals as the display pixel pitch P of the liquid crystal panel 10 shown in FIG. 12. A vertical line in FIG. 17 corresponds to one row of display pixels of a liquid crystal panel, and a horizontal line corresponds to a center line of that vertical direction. If the display pixels of a liquid crystal panel is assumed to be m (horizontal direction)×n (vertical direction), m partial picture images will be photographed by photographing at a position that the center of the video camera lens 7 corresponds with the intersecting point of the line group. These partial images are real images, and a display image of one picture screen is synthesized from these partial images. At this time, since only a region in the vicinity of the lens center axis is used, a real image and a Fourier transform image are almost the same in this region and a synthesized image becomes a discrete Fourier transform image sampled at the position of the video camera lens 7.

Figure 18:
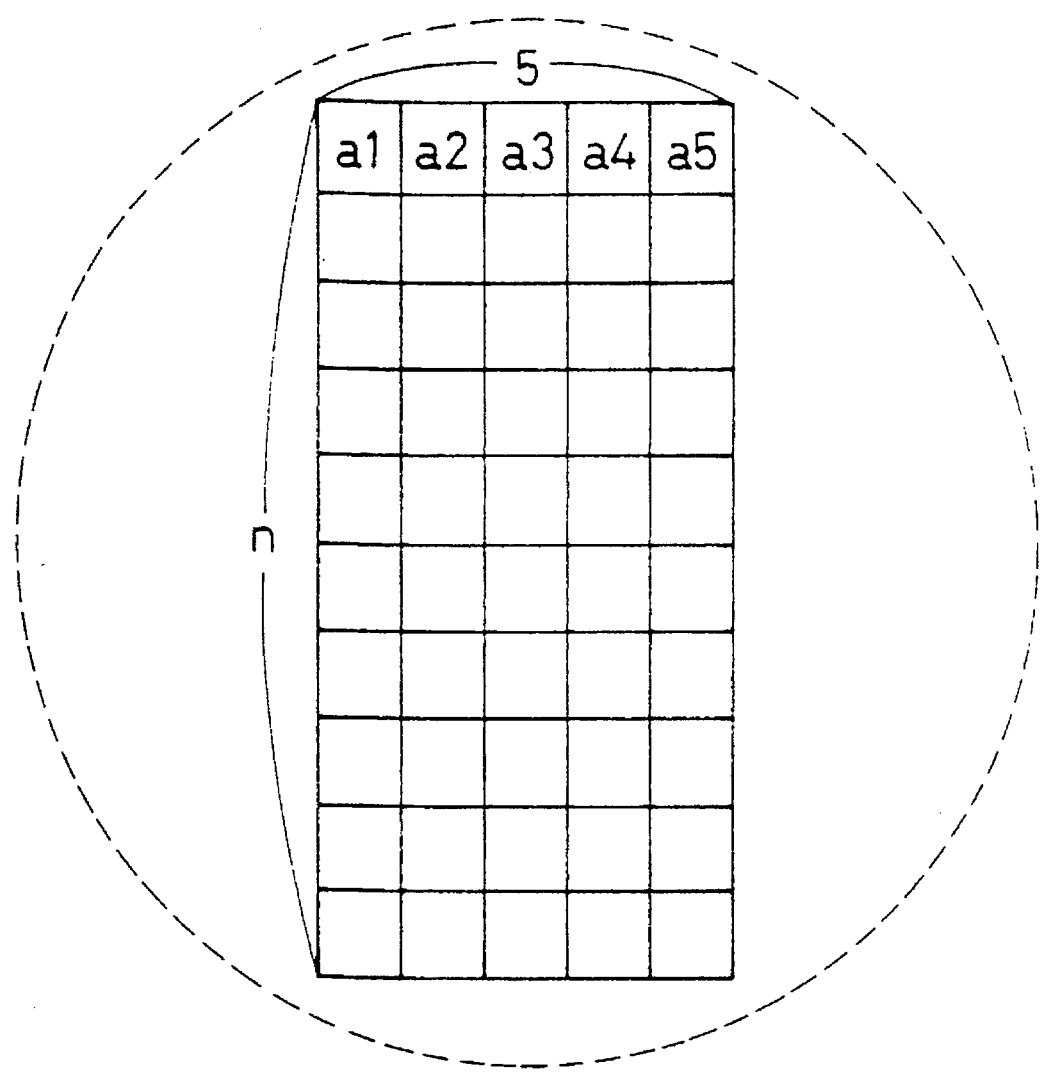
FIG. 18 is a diagram showing an example of a partial image extracted from one slit.

Next, a synthesizing method of partial images obtained by the above-described method will be described. (5×n) pixels on the liquid crystal panel 10 are assigned to one imaginary slit on an imaginary slit array. This means that light-beam angles in five directions per one imaginary slit are reproduced. In fact, in the three-dimensional information reproducing apparatus of this embodiment the slit array is not used, but the slit array is assumed to be positioned to the front of the liquid crystal panel 10 for making an explanation easy. For an image that is obtained with this method shown in FIG. 17 by placing a camera at the respective imaginary slit positions, only (5×n) pixels in the central portion become necessary, as shown in FIG. 18.

Figure 19:
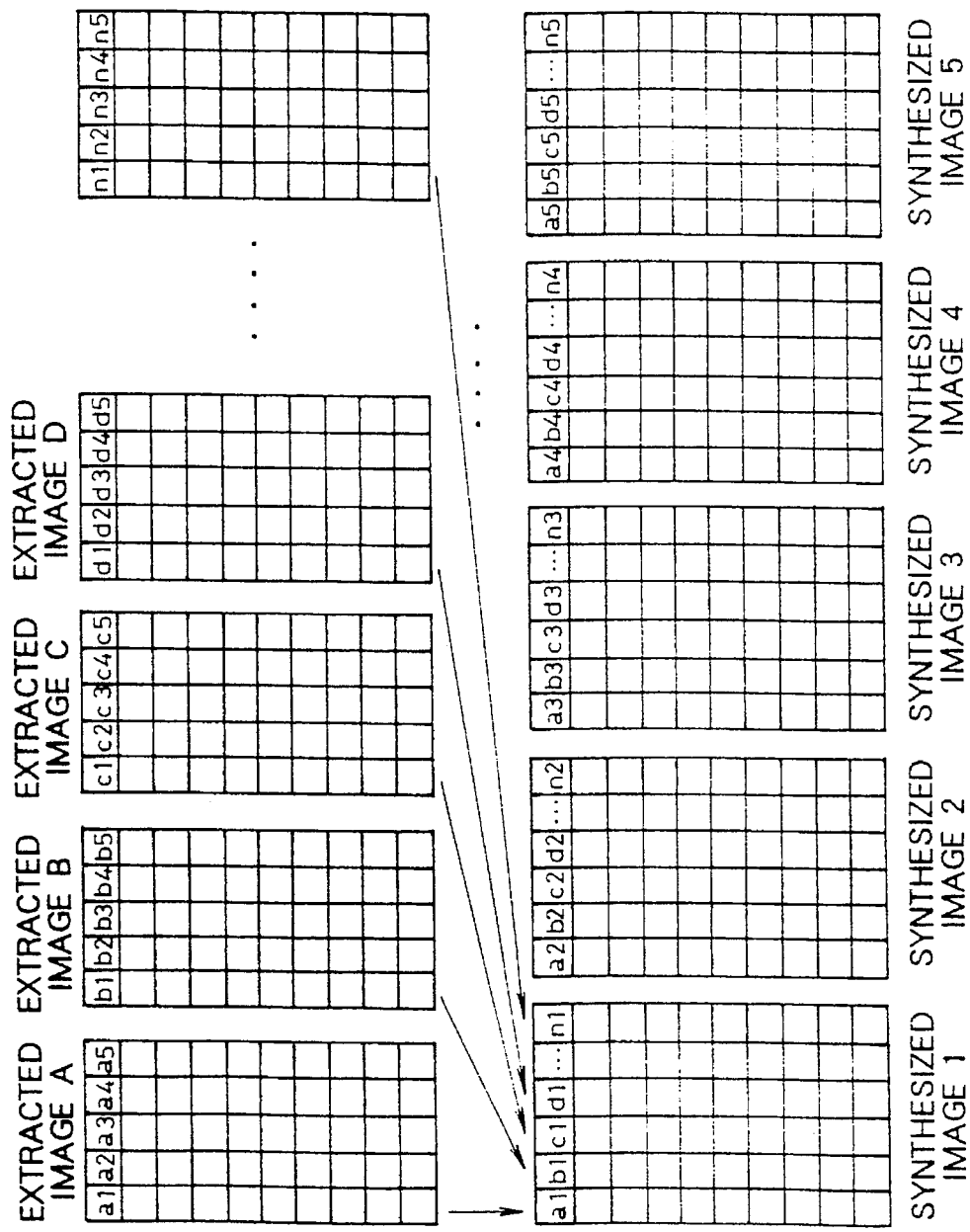
FIG. 19 is a diagram showing a case where an image synthesized from n partial images.

An image extracted from (5×n) pixels in the central portion of an image obtained at the position of an imaginary slit A is referred to as an extracted image A, and an image extracted from (5×n) pixels in the central portion of an image obtained at the position of an imaginary slit B is referred to as an extracted image B. The space between the imaginary slit A and the imaginary slit B is equal to the pixel pitch P of the liquid crystal panel 10. Since the m partial images have been recorded by the method of FIG. 17, the number of the extracted images will also be m. As shown in FIG. 19, one image is synthesized by collecting only the leftmost row from the respective m extracted images, and this synthesized image is referred to as a synthesized image 1. Likewise, only the second row from the left of each extracted image is collected and then a synthesized image 2 is synthesized, and only extracted images of the same row are collected in order from the m extracted images and then five synthesized images are synthesized. As will be clear from the way in which images are synthesized, one synthesized image becomes an image comprising (m×n) pixels. This synthesized image is an image in which the discrete Fourier transform image was divided into five parts, depending on a difference in the incidence angles of light beams.

Next, the reproducing operation of the synthesized image obtained by the above-described method will be described.

The discrete Fourier transform image obtained by the above-described method is an image in which the incidence angle in the horizontal direction of a light beam with respect to an imaginary slit passes through the slit and was transformed into a distance from an optic axis vertical to the slit array panel. Therefore, in order to reproduce this, a light beam can be emitted at an angle identical with the incidence angle. In this embodiment, this has been achieved by changing the angle of an illumination light beam of the display panel.

Figure 20:
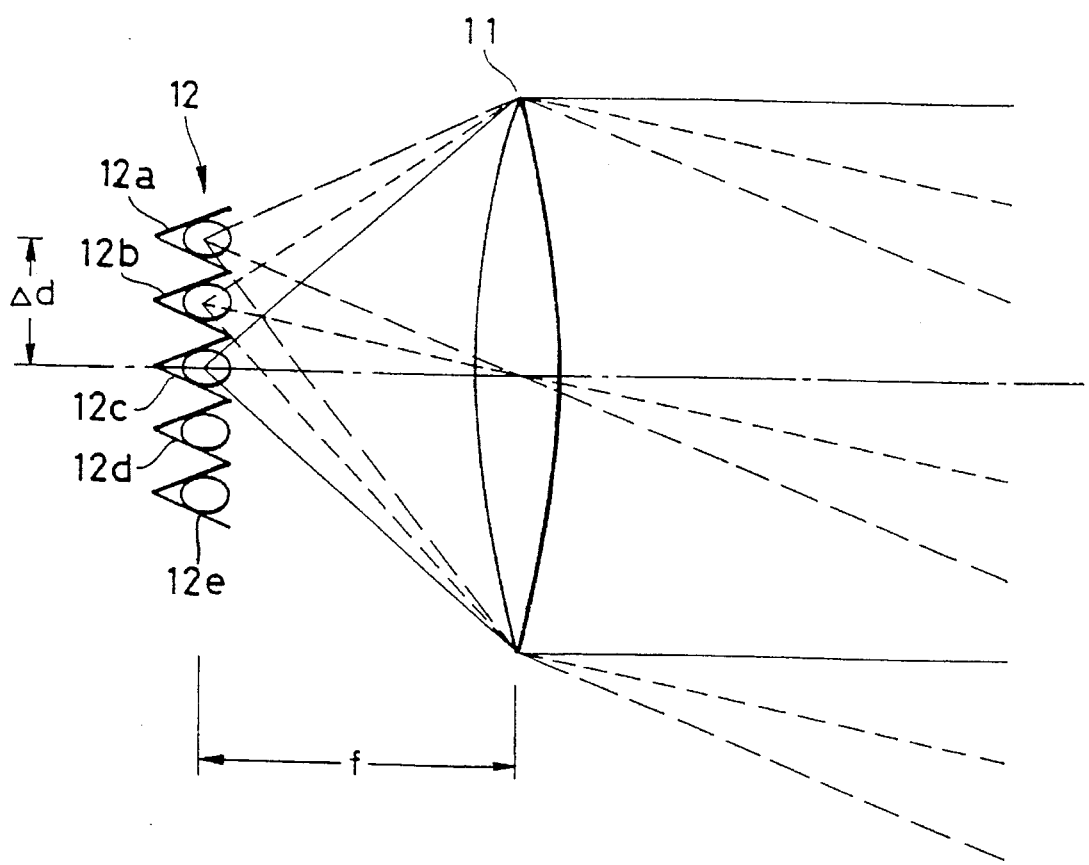
FIG. 20 is a diagram showing the change in the angle of a beam of light caused by the light source array of FIG. 11.

As described above, when the light-beam angles in five directions per one imaginary slit are reproduced, the angles of light beams for illuminating the liquid crystal panel 10 can be changed to Five directions. In the three-dimensional information reproducing apparatus of this embodiment, as shown in FIG. 20, the angles of light beams for illuminating the liquid crystal panel 10 are changed to five directions by combining a light source array 12 consisting of five light sources 12a to 12e and a cylindrical lens 11. The light source array 12 is located at a position that is away from the cylindrical lens 12 by the focal distance f of the lens 11. The light emitted from the light source in this position passes through the lens 11 and then becomes parallel light. When the position of the light source is dislocated from the lens 11 in the right-angle direction to the optic axis, the angle of the parallel light emitted from the lens 11 is changed according to the amount of the dislocation, Δd. Therefore, by arranging five light sources in the horizontal direction and switching a light source to be lit in order, the angle of illumination light can be changed.

Figure 21A:
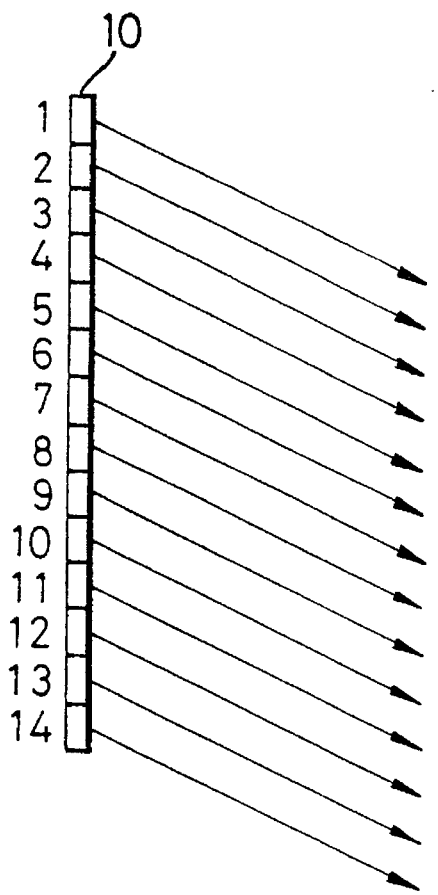
FIG. 21A is a diagram showing the reproduction state by a light source 12a, FIG. 21B is a diagram showing the reproduction state by a light source 12b.
Figure 21B:
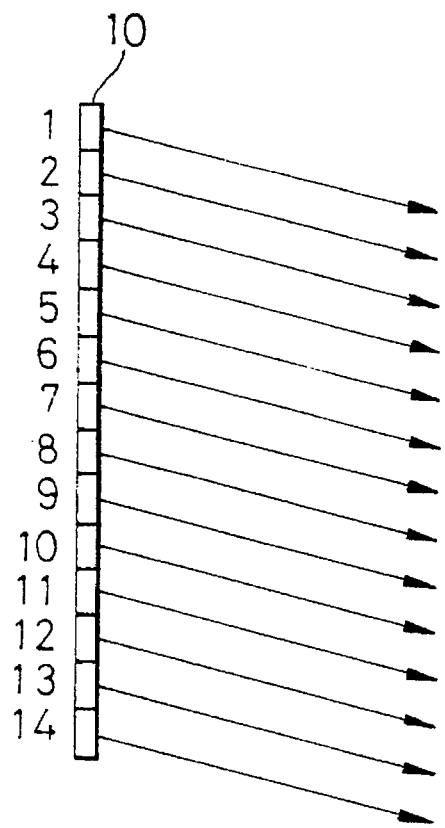
FIG. 21C is a diagram showing the change of an incidence angle by each light source.
Figure 21C:
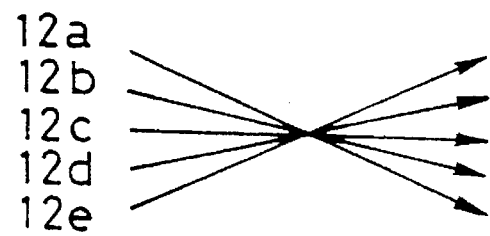

At this time, by the synchronous control circuit 13, a synthesized image that is displayed on the liquid panel 10 is changed in synchronization to a light source that is lit in such a manner that the synthesized image 1 of FIG. 19 is displayed on the liquid panel 10 when the light source 12a is lit and the synthesized image 2 of FIG. 19 is displayed on the liquid panel 10 when the light source 12b is lit. Since the angle of a light beam does not change as the light beam transmits through the liquid crystal panel 10, the reproduction state of the light beam becomes as shown in FIG. 21A, when the light source 12a is being lit, and the reproduction state of the light beam becomes as shown in FIG. 21B, when the light source 12b is being lit. At this time, in time division display, one cycle is constituted by five steps from the light source 12a to the light source 12e and the angle of incident light changes as shown in FIG. 21C, so the angle of the light emitted from the liquid crystal panel 10 also changes in the same way. In this embodiment, high-speed response is possible, because mechanical movement is not needed as the angle of incident light to the liquid crystal panel 10 is changed.

Figure 22B:
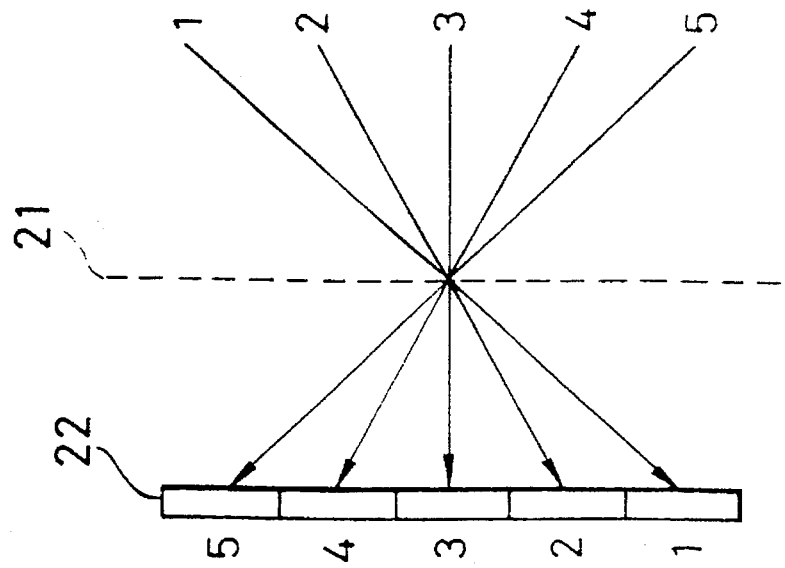
FIG. 22B is a diagram showing the extracted image of FIG. 19 corresponding to a beam of light of one cycle.
Figure 22A:
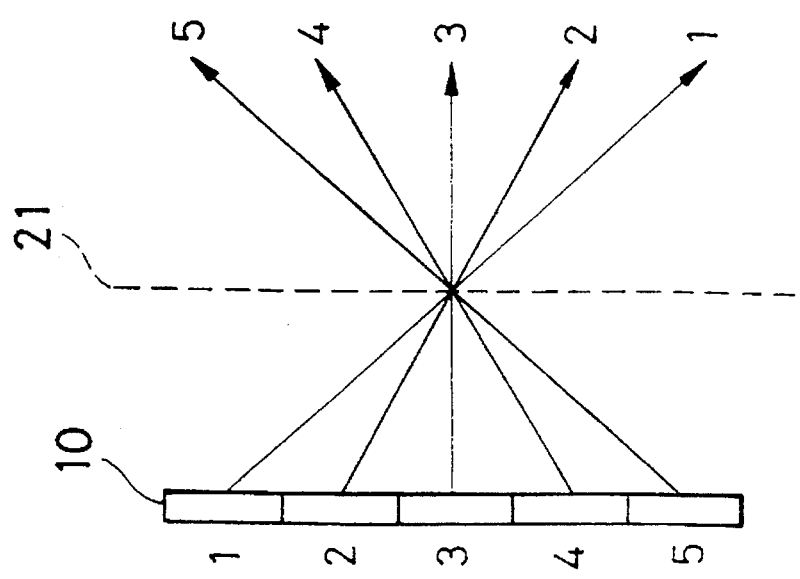
FIG. 22A is a diagram showing the reproduction state of a beam of light of one cycle.

One cycle of the reproduction state of the light beam is shown in FIG. 22A. Five display pixels on the liquid crystal panel 10 are assigned to each of the imaginary slits of an imaginary slit 21, and light beams are emitted to different angles by illuminating the respective display pixels with the parallel light beams emitted from different light sources. Note that the space between the imaginary slits in the imaginary slit panel 21 of the above-described case is the same as the display pixel pitch P of the liquid crystal panel 10. If the extracted image described in FIG. 19 correspond to FIG. 22A, the reproduction state will become as shown in FIG. 22B. The image that is recorded on an image pick-up surface 22 is one extracted image shown in FIG. 19, for example, the extracted image A. As will be seen From the comparison of FIG. 22A and FIG. 22B, the angle of a light beam incident upon the recording pixel 1 of FIG. 22B and the angle of a light beam emitted from the display pixel 1 of FIG. 22A are symmetrical with respect to the imaginary slit. This is because, in observing an object through a liquid crystal panel, it is observed from the side opposite to the surface on which the object has been recorded and therefore the depth side and this side are inverted with respect to the depth direction. In this embodiment, the angles of light beams emitted from the display pixels are symmetrical with respect to the imaginary slit by a combination of a synthesized image that is displayed and a light source that is lit.

A three-dimensional image is formed in a space of observation by reproducing light beams of various directions, as shown in FIG. 22A. Light from an object is originally scattered in all directions but it is to be sampled in the horizontal direction by an imaginary slit array. An observer can recognize the three-dimensional information of an object by perceiving the reproduced light beam with his or her eyes. In such a three-dimensional information reproducing apparatus of the type in which the state of a light beam is reproduced, special spectacles are not needed and a position of observation is not limited extremely like a so-called lenticular method. There is the advantage that a plurality of people can observe a reproduced image at the same time and, if a visual point is moved, then an image to be observed will be changed according to the movement of the visual point. Since the distance feeling of the reproduced image, i.e., three-dimensional feeling is recognized not only by binocular parallax but by the focusing function of eyes, there is a little fatigue feeling at the time of observation and there can be observed a more natural three-dimensional image.

In this embodiment, a three-dimensional image that is reproduced has parallax only in the horizontal direction, so an image that is observed would not change even if a visual point were moved in the vertical direction. However, vertical resolution is high, so a visually clear image is obtained. Further, since a screen such as a pinhole is not needed, light can effectively be utilized and a light three-dimensional image can be reproduced. In addition, since parallel light is used as illumination light, light that was transmitted through a liquid crystal panel does not spread out, a reproduced image becomes clear without becoming dim, light beams emitted from adjacent display pixels do not cross each other, and a three-dimensional image with no cross talk can be reproduced.

Figure 23:
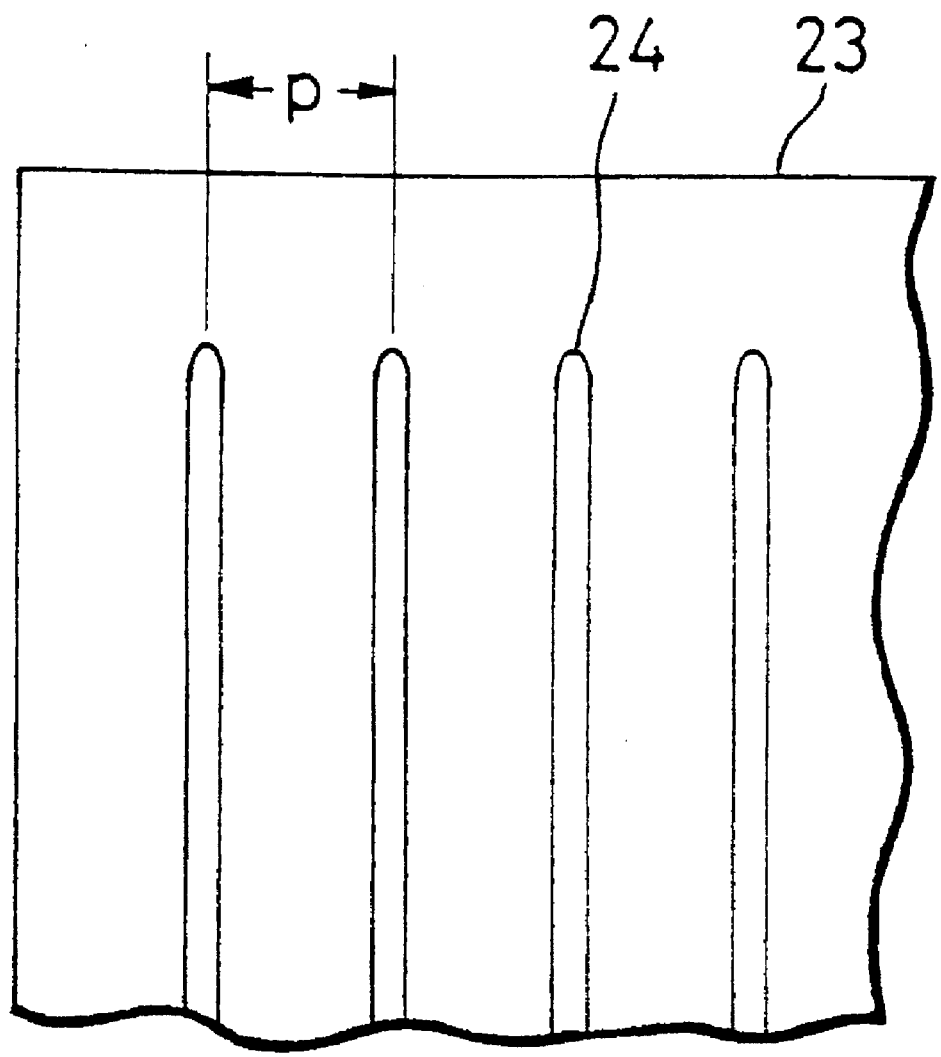
FIG. 23 is a diagram showing an example of a slit array panel.
Figure 24A:
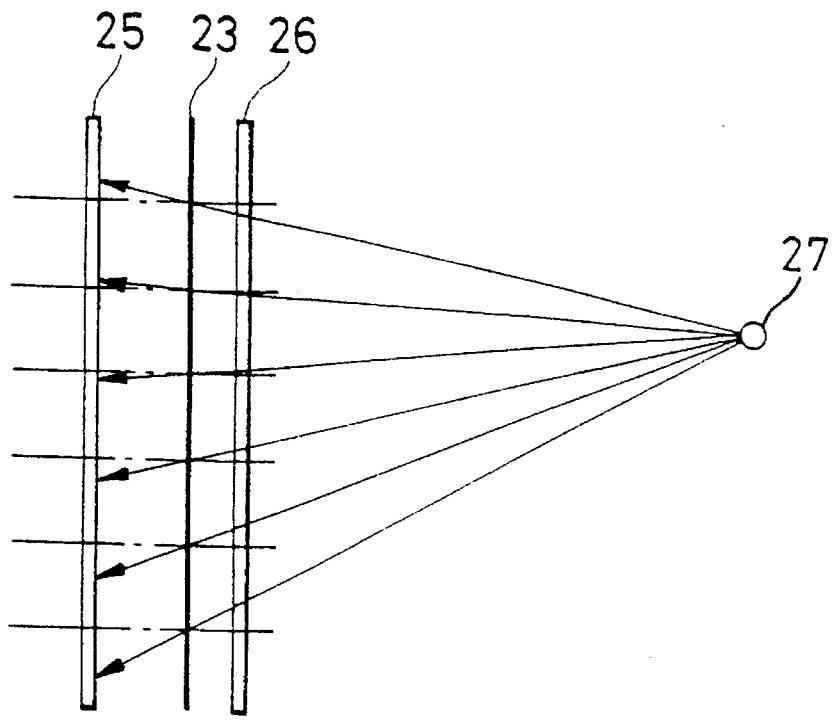
FIG. 24A is a top view showing a method of recording a Fourier transform image by the slit array panel of the FIG. 23
Figure 24B:
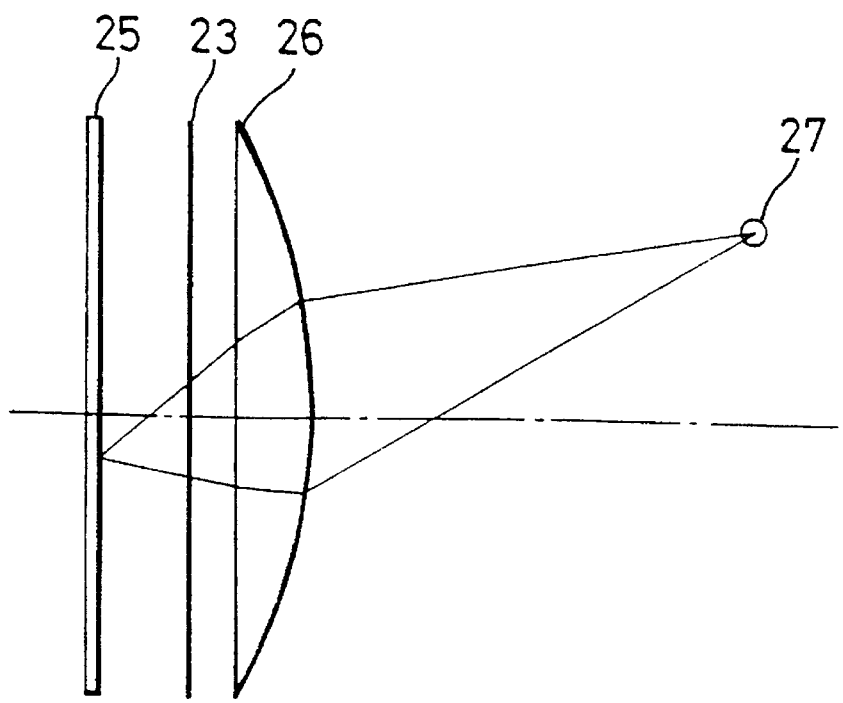
FIG. 24B is a side view of FIG. 24A.

In the above-described embodiment a method of obtaining a discrete Fourier transform image by one-dimensional sampling has been described, but in a case where sampling is performed only in the horizontal direction and, for the vertical direction, continuous recording is performed, a slit array panel such as the one shown in FIG. 23 may be employed. A plurality of elongated slits 24 are bored in a slit array panel 23 at pitch-P intervals in the vertical direction. As shown in FIG. 24A, the slit array panel 23 is disposed to the front of an image pick-up surface 25, and a cylindrical lens 26 with a curvature in the horizontal direction is disposed to the front of the panel 23. As shown in FIG. 24A, the light beams from an object 27 are recorded on the image pick-up surface 25 as discrete Fourier transform images in the horizontal direction. For the horizontal direction, the lens 26 operates on nothing. The lens 26 is employed to form an image as to the vertical direction. The space between the lens 26 and the image pick-up surface 25 is set so that the image forming requirements of the lens 26 are met.

Figure 25A:
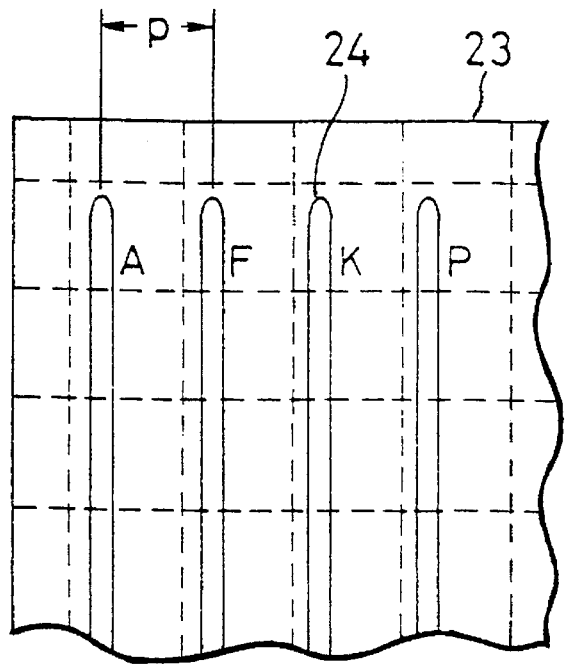
FIGS. 25A and 25B are diagrams showing a case where the position of a slit is varied with time.
Figure 25B:
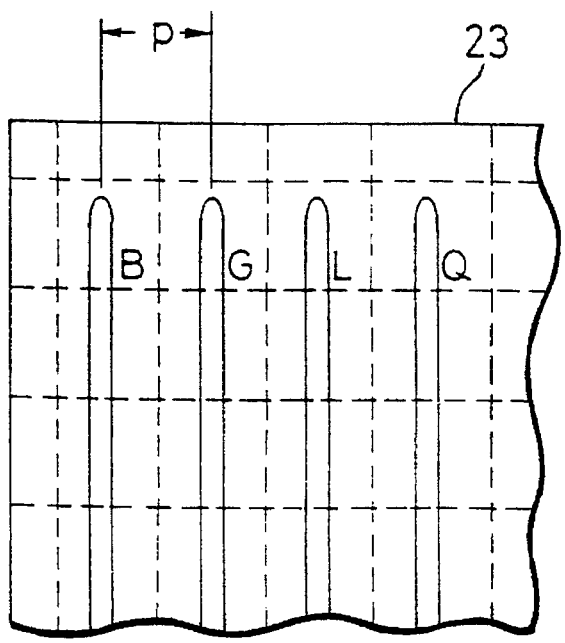

The recording of discrete Fourier images is performed by varying the position of the slit with time. When (5×n) pixels on the liquid crystal panel 10 correspond to one slit, the position of the slit is changed to five positions. To change the slit position, it may be moved mechanically, or by constituting the slit array panel with an optical shutter such as a liquid crystal panel, the optical shutter may electrically be changed. If it is assumed that the first slit position is a position shown in FIG. 25A, the slit position will be moved to the position shown in FIG. 25A in the horizontal direction. Dotted lines in FIGS. 25A and 25B are written at common positions of the figures so that the slit positions can easily be compared, and do not have special meanings. The amount of movement of the slit is equal to the pixel pitch P of the liquid crystal panel. By performing this slit movement in the horizontal direction in order, five recorded images are obtained. Note that one recorded image comprises (m×n) pixels.

Figure 26:
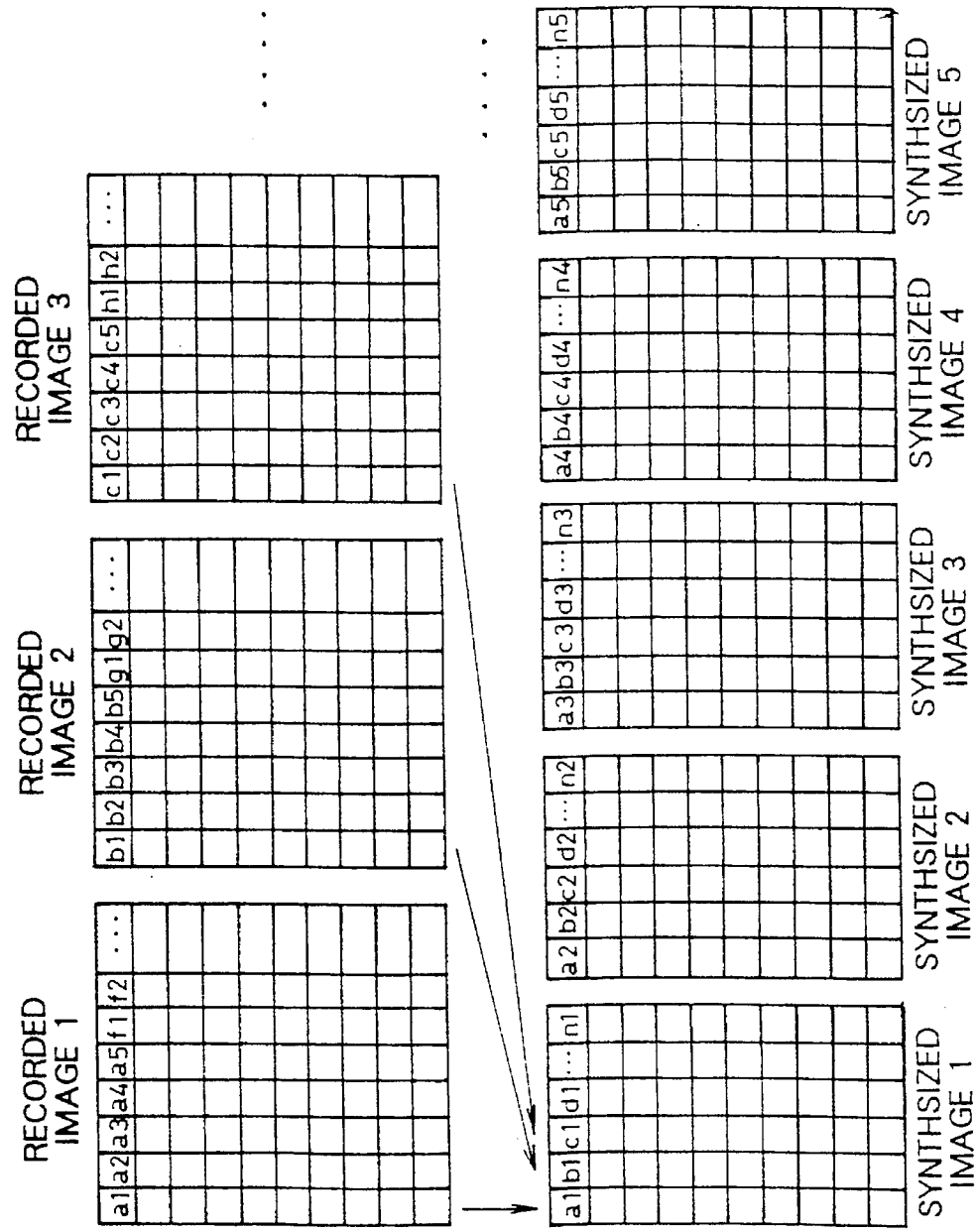
FIG. 26 is a diagram showing a synthesizing method of the recorded image obtained by the slit array panel.

Next, a synthesizing method of the recorded images obtained by the above-described method will be described making reference to FIG. 26.

In the recorded image, five rows corresponding to one slit are handled as one unit, and the one unit is repeatedly arranged. First, for the respective recorded images, only the leftmost row is extracted for each unit. At this time, the total m/5 rows is extracted from one extracted image at intervals of five rows. The images extracted from five recorded images in this way are collected up and synthesized into one image. This is referred to as a synthesized image 1. Likewise, only the second row from the left is extracted for each unit, and the extracted second rows are collected up and synthesized into a synthesized image 2. Only extracted images of the same row are collected in order from the m extracted images and then five synthesized images are synthesized. As will be clear from the way in which images are synthesized, one synthesized image becomes an image comprising (m×n) pixels. This synthesized image is an image in which the discrete Fourier transform image was divided into five parts, depending on a difference in the incidence angles of light beams, and is identical with the synthesized image of FIG. 8.

While, in the above-described embodiment, five rows of pixels have been assigned to one slit, in the present invention the number of pixels that are assigned is not limited to five rows.

Also, in the above-described embodiment, the cylindrical lens 11 or 16 may be replaced with a Fresnel lens equivalent to the cylindrical lens. This embodiment requires a cylindrical lens of the same size as a display panel or an image pick-up surface, and by replacing the lens with a Fresnel lens, thinning and lightening can be improved.

Next, a second embodiment of the three-dimensional information reproducing apparatus of the present invention will be described by making reference to FIG. 27.

Figure 27:
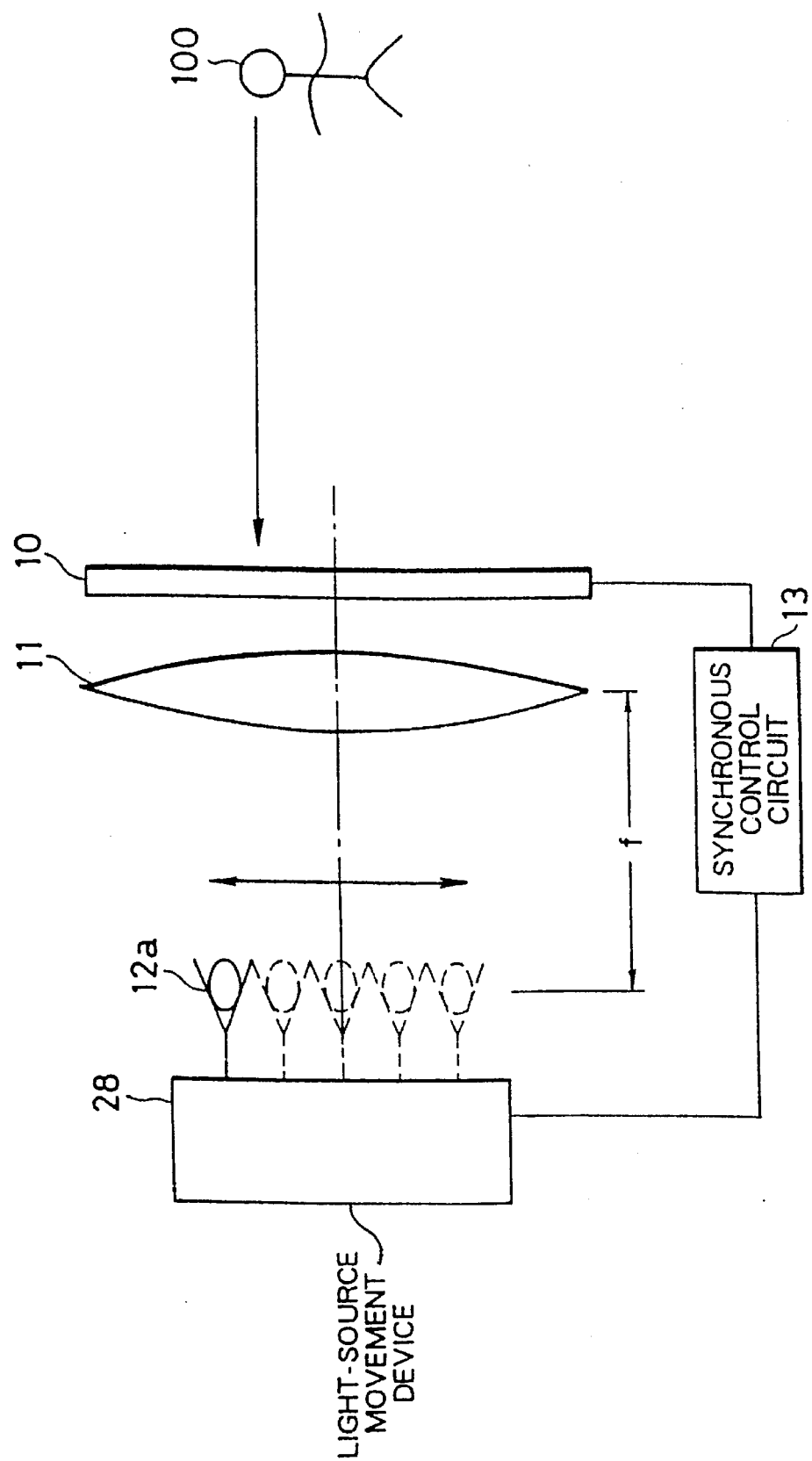
FIG. 27 is a diagram used to explain a second embodiment of the three-dimensional information reproducing apparatus of the present invention.

The three-dimensional information reproducing apparatus of this embodiment, as shown in FIG. 27, comprises a liquid crystal panel 10 as image display means for displaying a discrete Fourier transform image with time division, a cylindrical lens 11 arranged to the rear of the liquid crystal panel 10 and having a curvature in the horizontal direction, a light source 12a arranged in a position away from the rear of the cylindrical lens 11 by a distance equal to the focal distance f of the lens 11, the lens 11 and light source 12a serving as illumination means, a light source moving device 28 as light source moving means for moving the light source 12a in the right-angle direction with respect to the optic axis, and a synchronous control circuit 13 as synchronous control means for controlling the discrete Fourier transform image that is displayed on the liquid crystal panel 10 and also the position of the light source 12a that is moved by the light source moving device 28. The principles of forming a space image by the display and reproduction of the discrete Fourier transform image are the same as the first embodiment, and the reproduction of the light beam is performed by changing the incidence angle of illumination light to the liquid crystal panel. The light that was transmitted through the cylindrical lens 11 becomes parallel light, as is the case of FIG. 20, and the angle of the parallel light changes according to the movement of the light source 12a. The display image of the liquid crystal panel 10 is switched by the synchronous control circuit 13 in accordance with the amount of movement of this light source 12a. For example, the synthesized image 1 shown in FIG. 8 is displayed when the light source 12a is in a first position, and the synthesized image 2 shown in FIG. 8 is displayed when the light source 12a is in a second position.

In the three-dimensional information reproducing apparatus of this embodiment, the direction of light that can be reproduced is determined by the amount of movement of the light source, so the number of pixels on the liquid crystal panel corresponding to one imaginary slit can be altered easily and changed in infinite steps within a range of the amount of movement of the light source.

Note that, in the second embodiment, the cylindrical lens 11 may also be replaced with a Fresnel lens equivalent to the cylindrical lens. This embodiment requires a cylindrical lens of the same size as a display panel or an image pick-up surface, and by replacing the lens with a Fresnel cylindrical lens, thinning and lightening can be improved. Also, instead of moving the light source 12a, the cylindrical lens may be moved.

Figure 28:
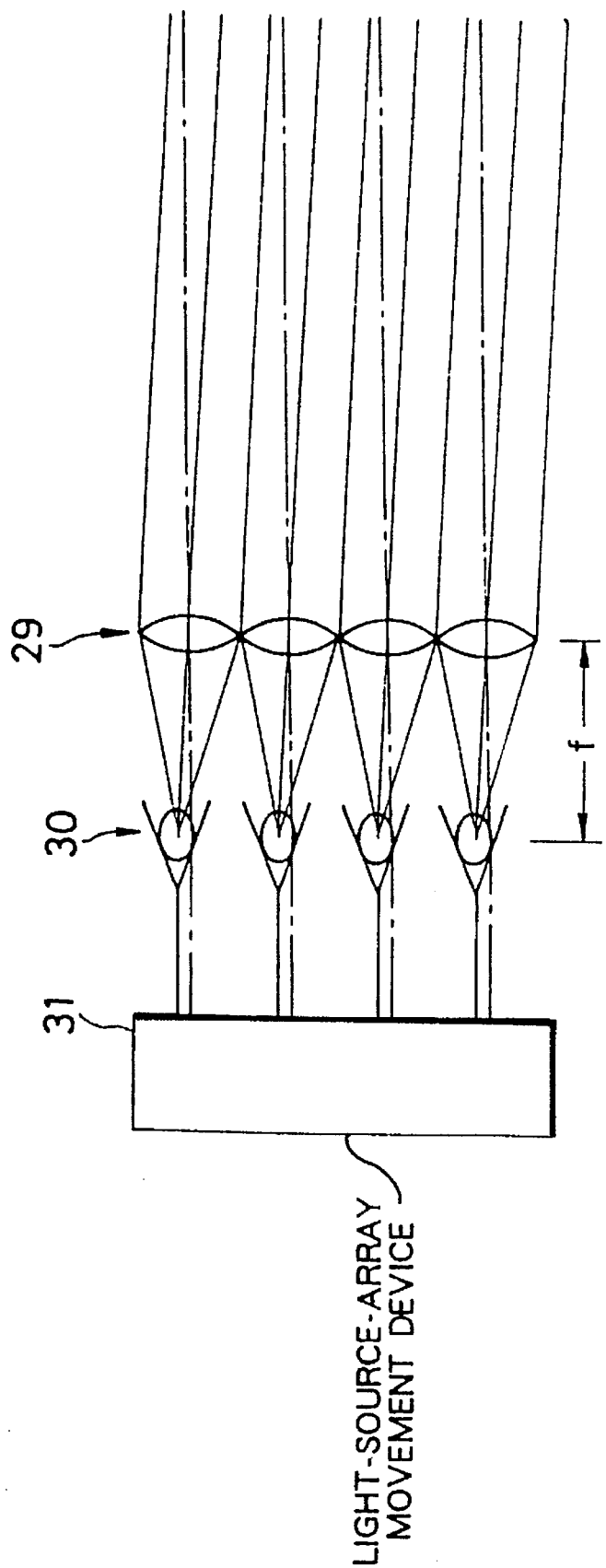
FIG. 28 is a diagram used to explain a third embodiment of the three-dimensional information reproducing apparatus of the present invention.

Next, a third embodiment of the three-dimensional information reproducing apparatus of the present invention will be described making reference to FIG. 28.

The basic constitution of the three-dimensional information reproducing apparatus of this embodiment is identical with the second embodiment shown in FIG. 27 but different in that the cylindrical lens 11 is replaced with a cylindrical lens array 29, the light source 12a is replaced with a light source array 30, and the light source moving device 28 is replaced with a light source array moving device 31. The principles of forming a space image by the display and reproduction of the discrete Fourier transform image are the same as the first embodiment, and the reproduction of the light beam is performed by changing the incidence angle of illumination light to the liquid crystal panel. The reason that a light source comprises a light source array is that as described in the first embodiment, the light source is not lit with time division but illumination light is spatially divided. All light sources are lit at all times. For each combination of one light source and one cylindrical lens in FIG. 28, the light that was transmitted through the cylindrical lens becomes parallel light, and the angle of the parallel light changes according to the movement of the light source. If these light beams are arranged in the horizontal direction, they become as shown in FIG. 28. In FIG. 28 the light source array 30 is constituted by four light sources, the amount of dislocation from the optic axis of the light source is the same, and the directions of the light beams that are emitted from the cylindrical lenses are all the same. Also, since they are parallel light, no overlapping of the light beams occurs. With the space between the light sources held constant, the light sources are moved as one united body by the light source array moving device 31, so the angle of the entire illumination is changed. At this time, the display image of the liquid crystal panel 10 is switched according to the amount of movement of the light source by the synchronous control circuit 13.

In the three-dimensional information reproducing apparatus, in addition to the advantage of the second embodiment, there is the advantage that the amount of movement of the light source can be made small. In addition, the respective cylindrical lens can be made small, so it becomes hard that they are affected by aberration. Note that instead of moving the light source array 30, the cylindrical lens array 29 may be moved.

Figure 29:
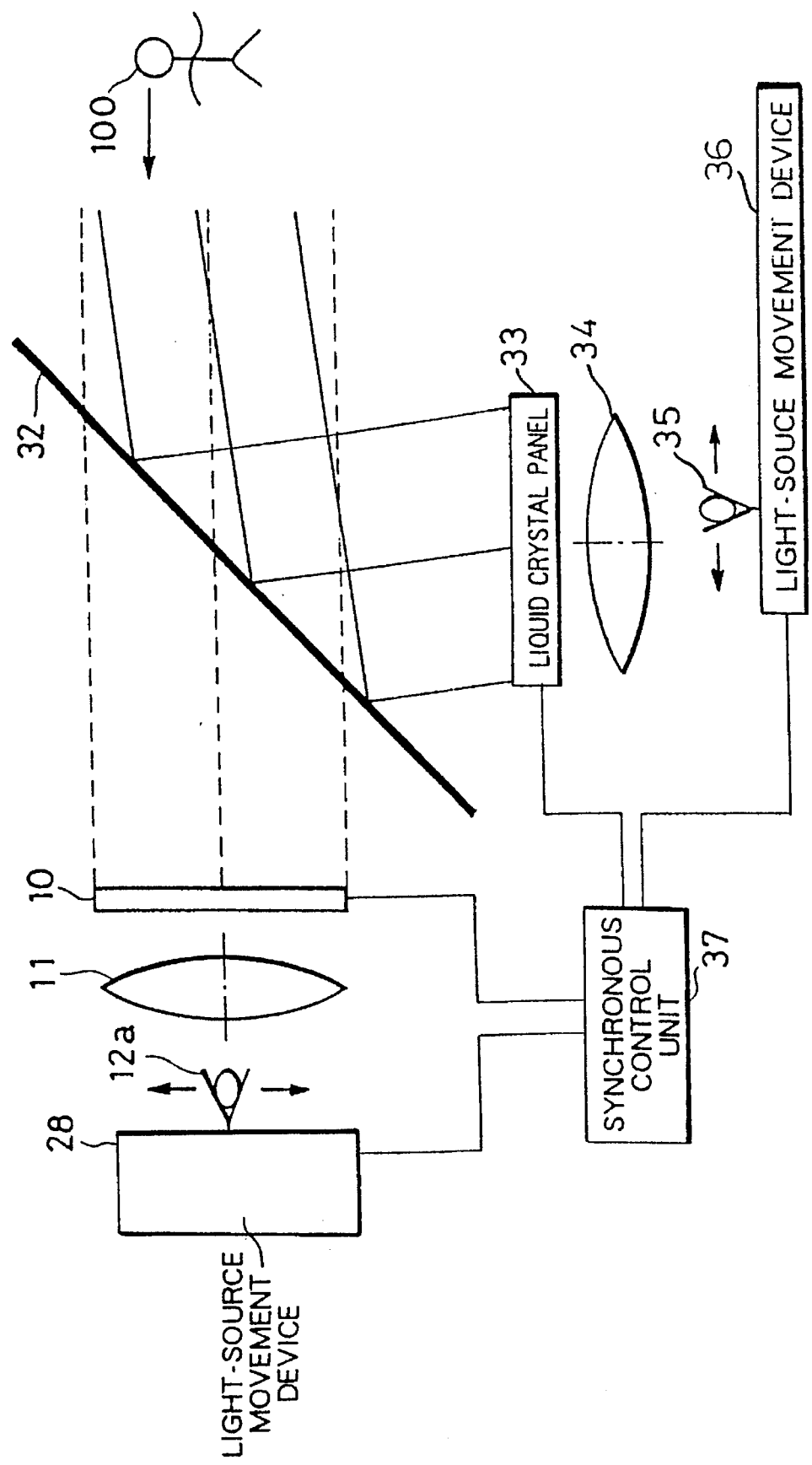
FIG. 29 is a diagram used to explain a fourth embodiment of the three-dimensional information reproducing apparatus of the present invention.

Next, a fourth embodiment of the three-dimensional information reproducing apparatus of the present invention will be described making reference to FIG. 29.

The three-dimensional information reproducing apparatus of this embodiment comprises a liquid crystal panel 10 as first image display means for displaying a discrete Fourier transform image with time division, a cylindrical lens 11 disposed to the rear of the liquid crystal panel 10 and having a curvature in the horizontal direction, a light source 12a for emitting light which is disposed in a position away from the rear of the cylindrical lens 11 by a distance equal to the focal distance of the lens 11, the lens 11 and the light source 12a serving as first illumination means, a light source moving device 28 as first light source moving means for moving the light source 12a in the right-angle direction with respect to the optic axis, a beam combiner 32 which is disposed to the front of the liquid crystal panel 10 and which reflects part of the light and transmitting the remaining light therethrough, a liquid crystal panel 33 as second image display means disposed to the front of the beam combiner 32, a cylindrical lens 34 disposed to the rear of the liquid crystal panel 33 and having a curvature in the horizontal direction, a light source 35 for emitting light which is disposed in a position away from the rear of the cylindrical lens 34 by a distance equal to the focal distance of the lens 34, the lens 34 and the light source 35 serving as second illumination means, a light source moving device 36 as second light source moving means for moving the light source 35 in the right-angle direction with respect to the optic axis, and a synchronous control circuit 37 as synchronous control means for switching and controlling, with time division, the discrete Fourier transform image that is displayed on the liquid crystal panels 10 and 33 and also the amounts of movement of the light sources 12 and 35. The light beams emitted from the two liquid crystal panels 10 and 33 are synthesized by the beam combiner 32. The principles of forming a space image by the display and reproduction of the discrete Fourier transform image are the same as the first embodiment, and the reproduction of the light beam is performed by changing the incidence angle of illumination light to the liquid crystal panel. Also, if the light beams are reflected by the beam combiner 32, the right and left sides of an image will be inverted, so the right and left sides of an image that is displayed on the liquid crystal panel 33 on the light-reflected side have been inverted in advance. Since parallel light is used as illumination light, light that was transmitted through a liquid crystal panel does not spread out, as described in the prior art, and a reproduced image can be made clear without dimness.

The light reproduction of this embodiment can be considered to be one in which one display panel in the above-described embodiment was distributed to two display panels. The positions of the two light sources 12a and 35 are controlled so that the light beams from the light sources 12a and 35 can be emitted at different angles after the beam combiner 32. Needless to say, the emission direction of each of the light beams must be in a direction that the recorded light direction is reproduced. In this embodiment, two three-dimensional information reproducing apparatuses that are combined by the beam combiner 32 may be any one of the first, second, and third embodiments. Also, the three-dimensional information reproducing apparatuses that are combined are not limited to two apparatuses but may be three or more apparatuses.

In the three-dimensional information reproducing apparatus, the speed at which the display image is switched with time division can be slow. For example, in a case where two three-dimensional information reproducing apparatuses are combined, the switching speed can be ½ the case where apparatuses are not combined. This is effective when the response speed of the liquid crystal panel is not high. If the switching speed is slow, the display time per one synthesized image will become longer, and a three-dimensional image that is reproduced will become lighter.

When in this embodiment the display image is switched at the same speed as the case that apparatuses are not combined, there is obtained a three-dimensional image whose resolution is higher than that of the case that apparatuses are not combined. For example, when two three-dimensional information reproducing apparatuses are combined, there is obtained twice as much resolution as the case that apparatuses are not combined.

Figure 30:
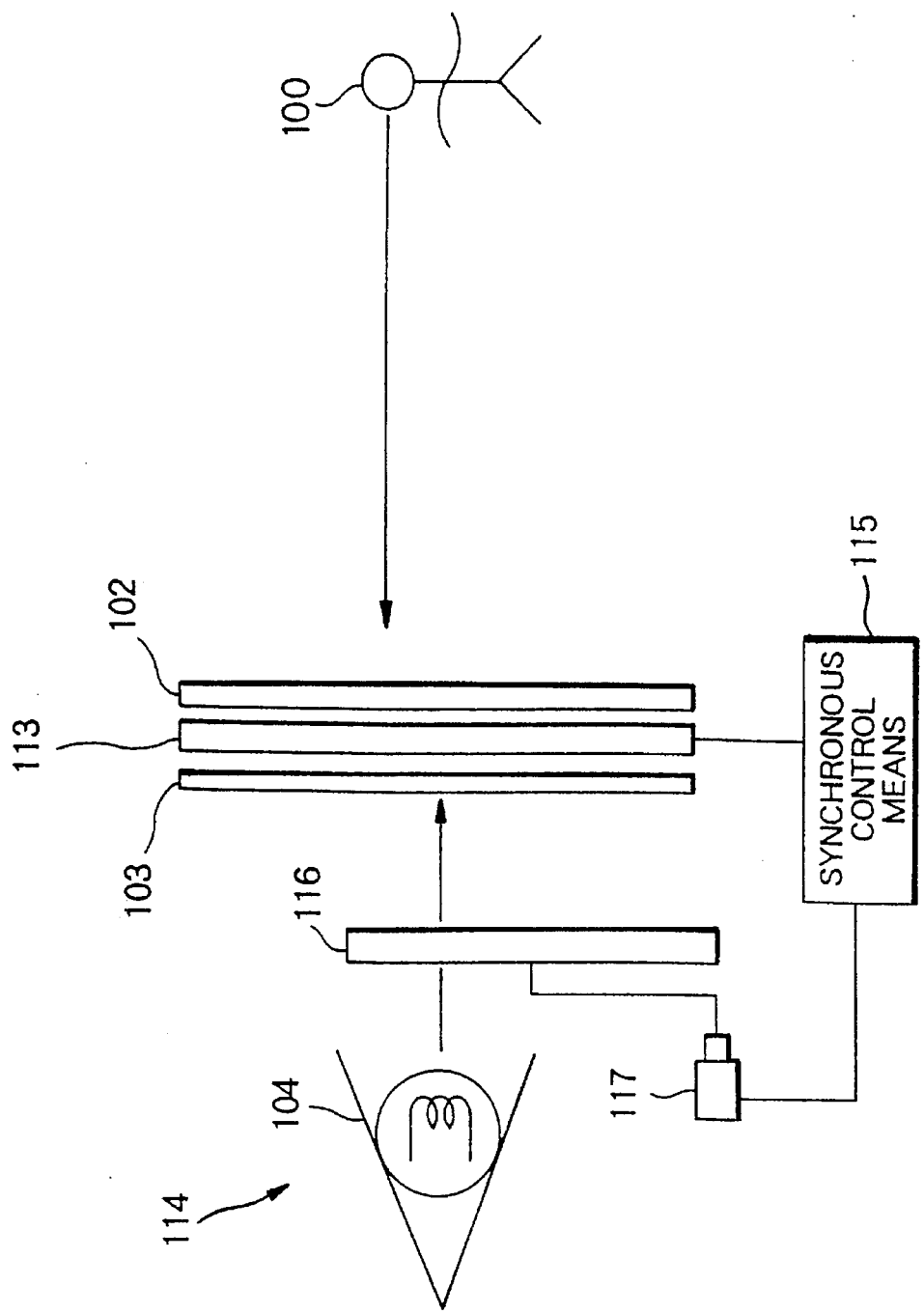
FIG. 30 is a diagram used to explain a fifth embodiment of the three-dimensional information reproducing apparatus of the present invention.

A fifth embodiment of the three-dimensional information reproducing apparatus of the present invention will hereinafter be described making reference to FIG. 30.

This embodiment comprises a liquid crystal panel 113 as image display means for displaying a discrete Fourier transform image resolved into color components with time division, a pinhole array panel 102 as optical means disposed to the front of the liquid crystal panel 113 and having a discrete Fourier transform operation at least in the horizontal direction, a diffusion plate 103 which is disposed to the rear of the liquid crystal panel 113 and which diffuses light, illumination means 114 which is disposed to the rear of the liquid crystal panel 113 and which radiates, to the liquid crystal panel 113, emitted light whose color changes with time division, and synchronous control means 115 for synchronizing and switching a display image resolved into color components that is displayed on the liquid crystal panel 113 and a color of illumination light that is radiated from the illumination means 114. The illumination means 114 consists of a white light source 104 for radiating light, a rotary color filter 116 in the form of a disc, and a motor 117 for rotating and driving the color filter 116.

Figure 31:
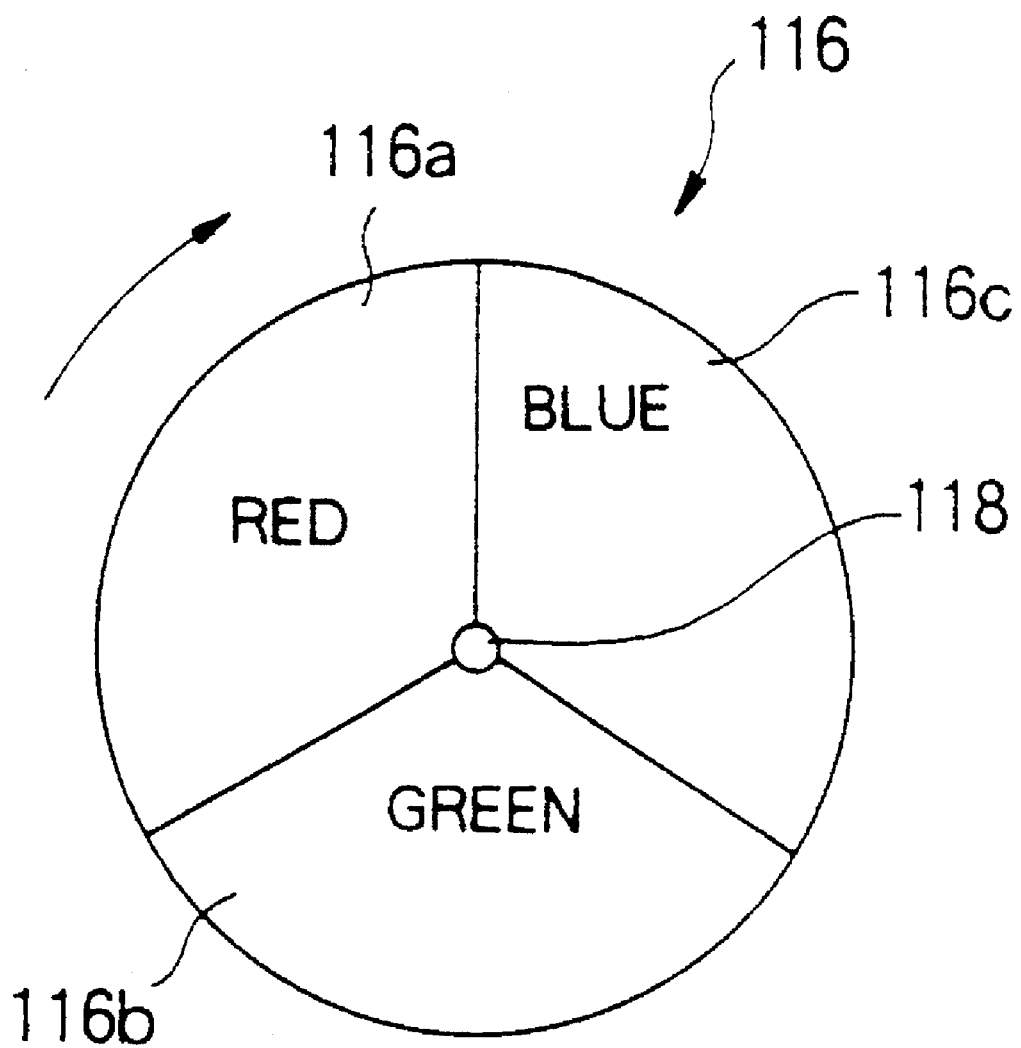
FIG. 31 is a diagram showing the constitution of the color filter of the embodiment of FIG. 30.

The color filter 116 is divided into three parts in the circumferential direction, as clearly shown in FIG. 31. A red transparent filter 116a, a green transparent filter 116b, and a blue transparent filter 116c are attached to the fan-shaped regions of the color filter 116, respectively. The color filter 116 is so constructed as to rotate on an axis of rotation 118. Note that the positions of the light source 104 and the color filter 118 are determined so that the spread of the light emitted from the light source 104 becomes smaller at the position of the color filter 116 than the transparent filters 116a, 116b, and 116c.

Figure 1:
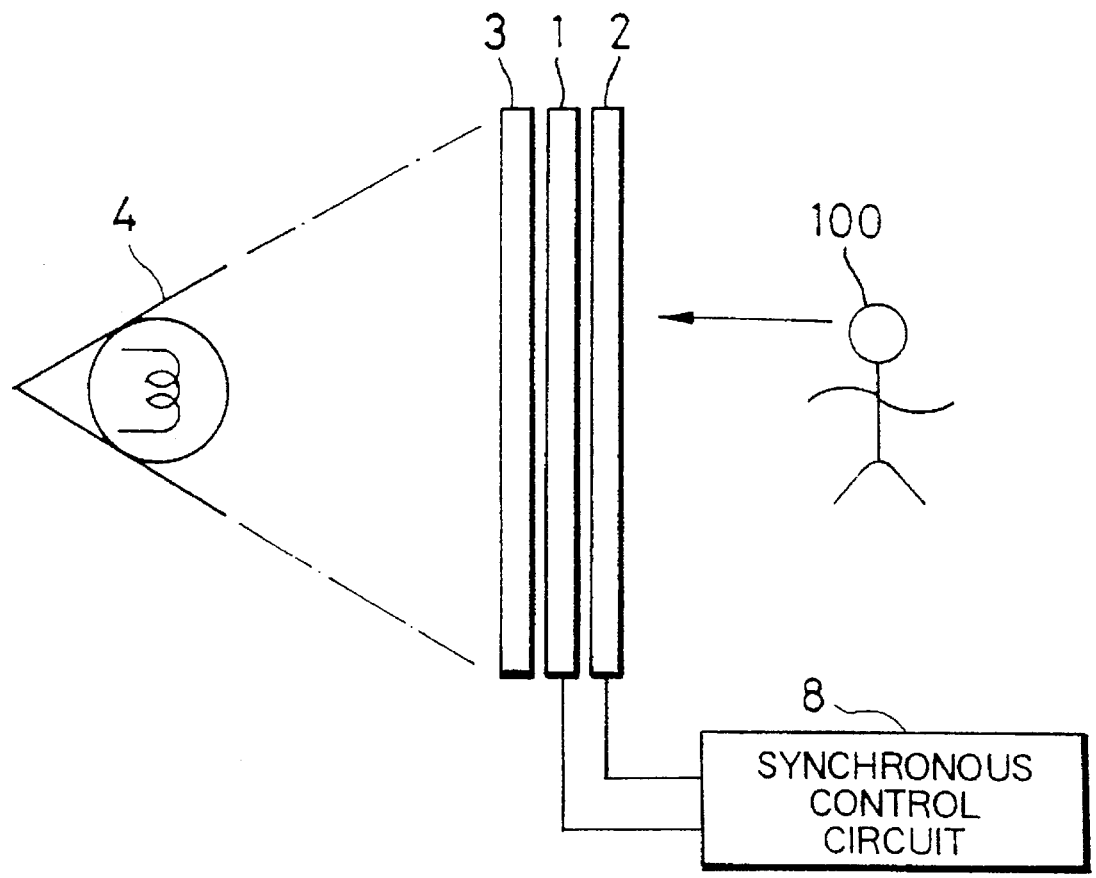
FIG. 1 is a diagram showing an example of a conventional three-dimensional information reproducing apparatus.
Figure 2:
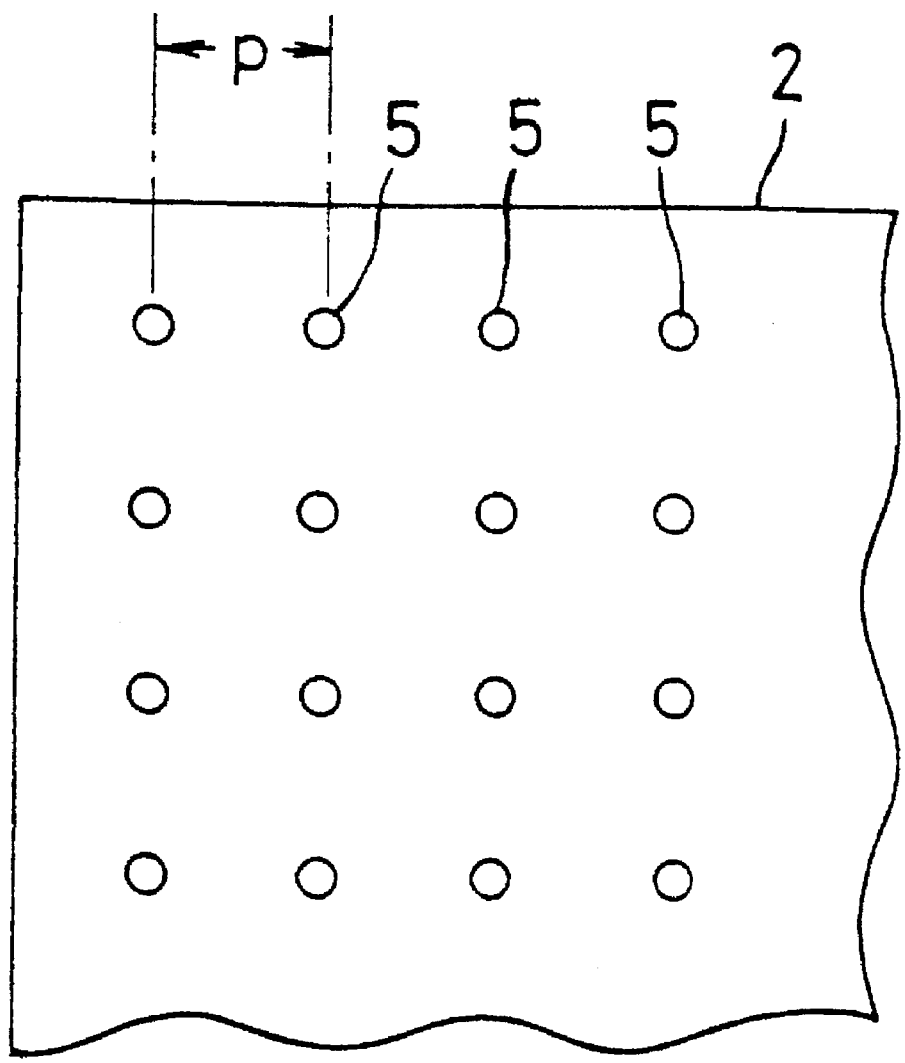
FIG. 2 is a diagram showing an example of a pinhole array panel.
Figure 3:
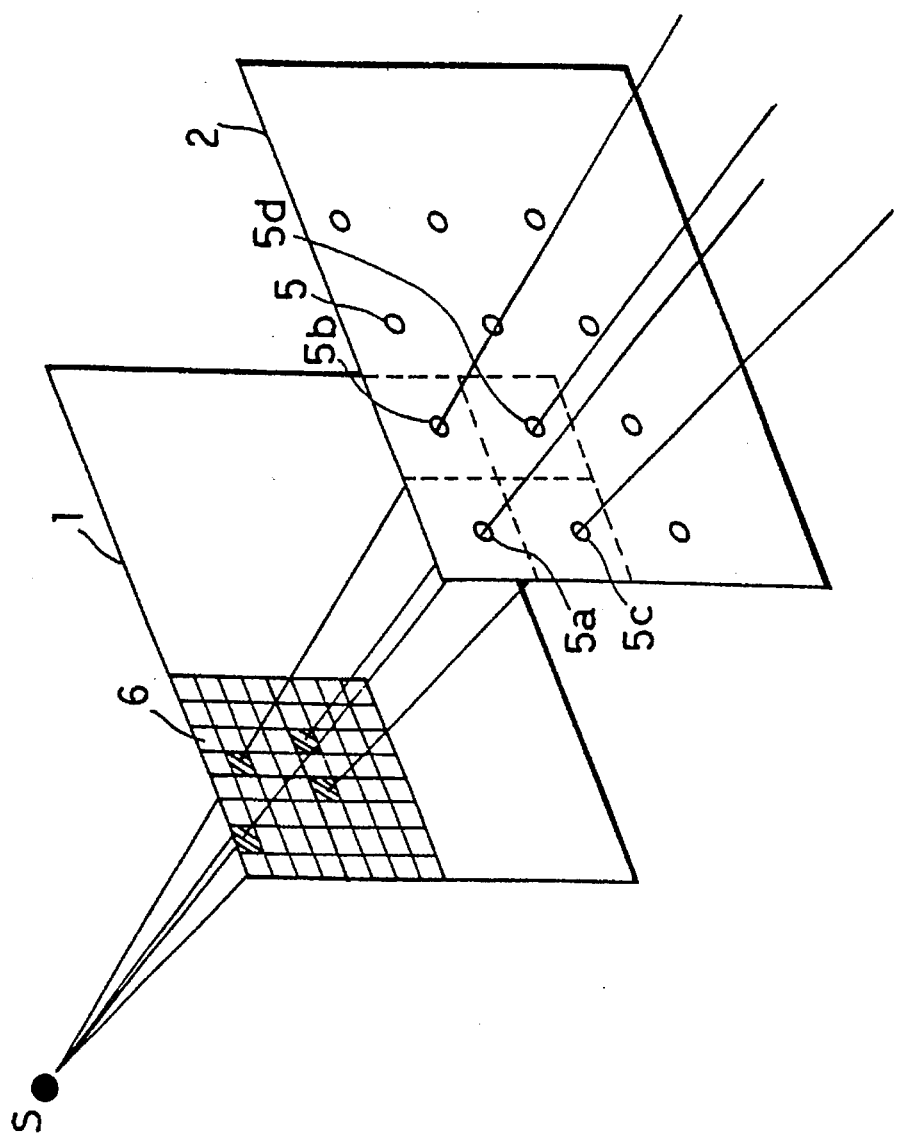
FIG. 3 is a diagram used to explain the principles of reproduction of a three-dimensional image in the three-dimensional information reproducing apparatus.

As with FIG. 2, a plurality of pinholes 5 are bored in the pinhole array panel 102 at pitch-P intervals in the vertical and horizontal directions. In the liquid crystal panel 113 there are two-dimensionally arranged a plurality of pixels corresponding to the pinholes 5 of the panel 102.

The operation of this embodiment will be described. The input method of the discrete Fourier transform image of this embodiment is performed in the same way as the method described in the prior art of FIGS. 2 and 4.

Figure 32:
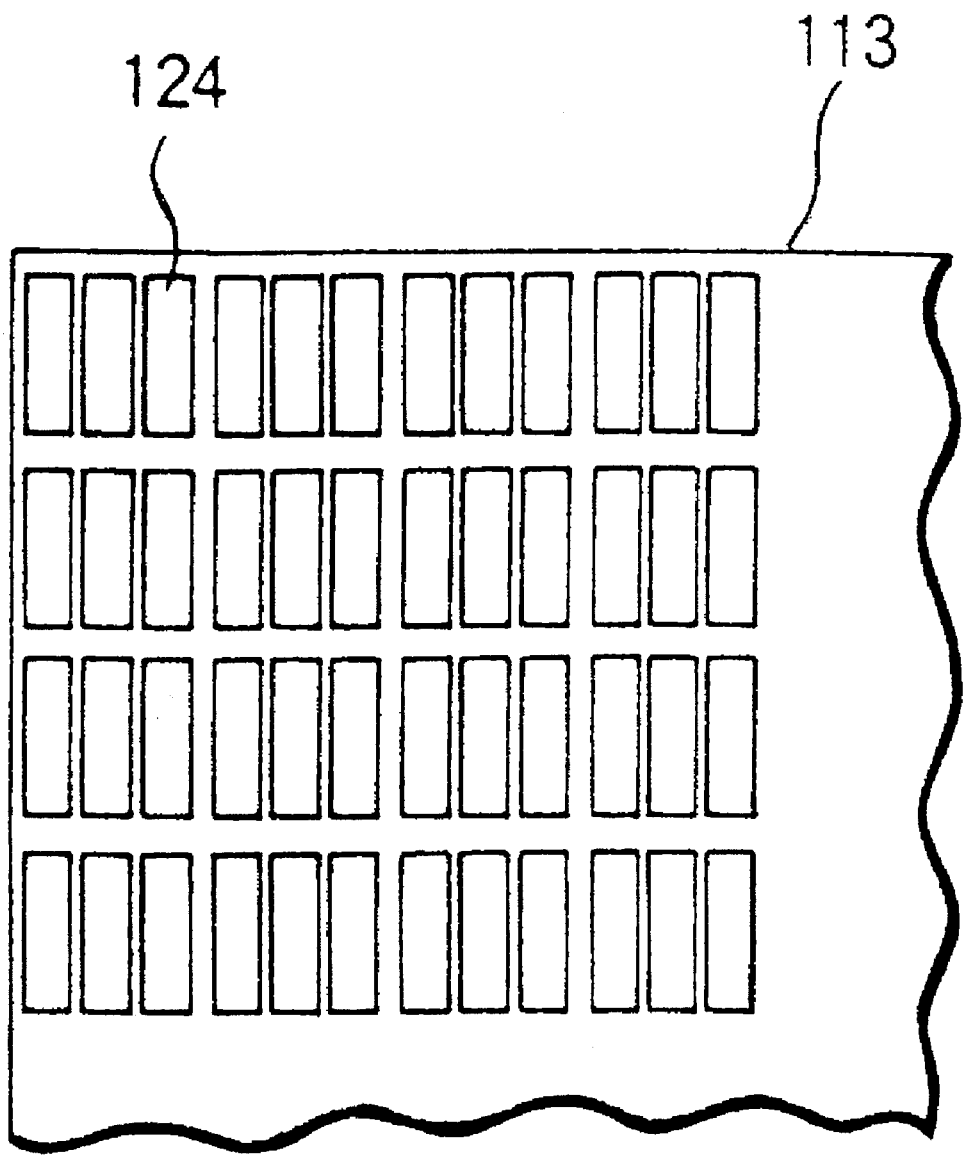
FIG. 32 is a diagram showing the constitution of the pixels of the liquid crystal panel of the embodiment of FIG. 30.
Figure 33:
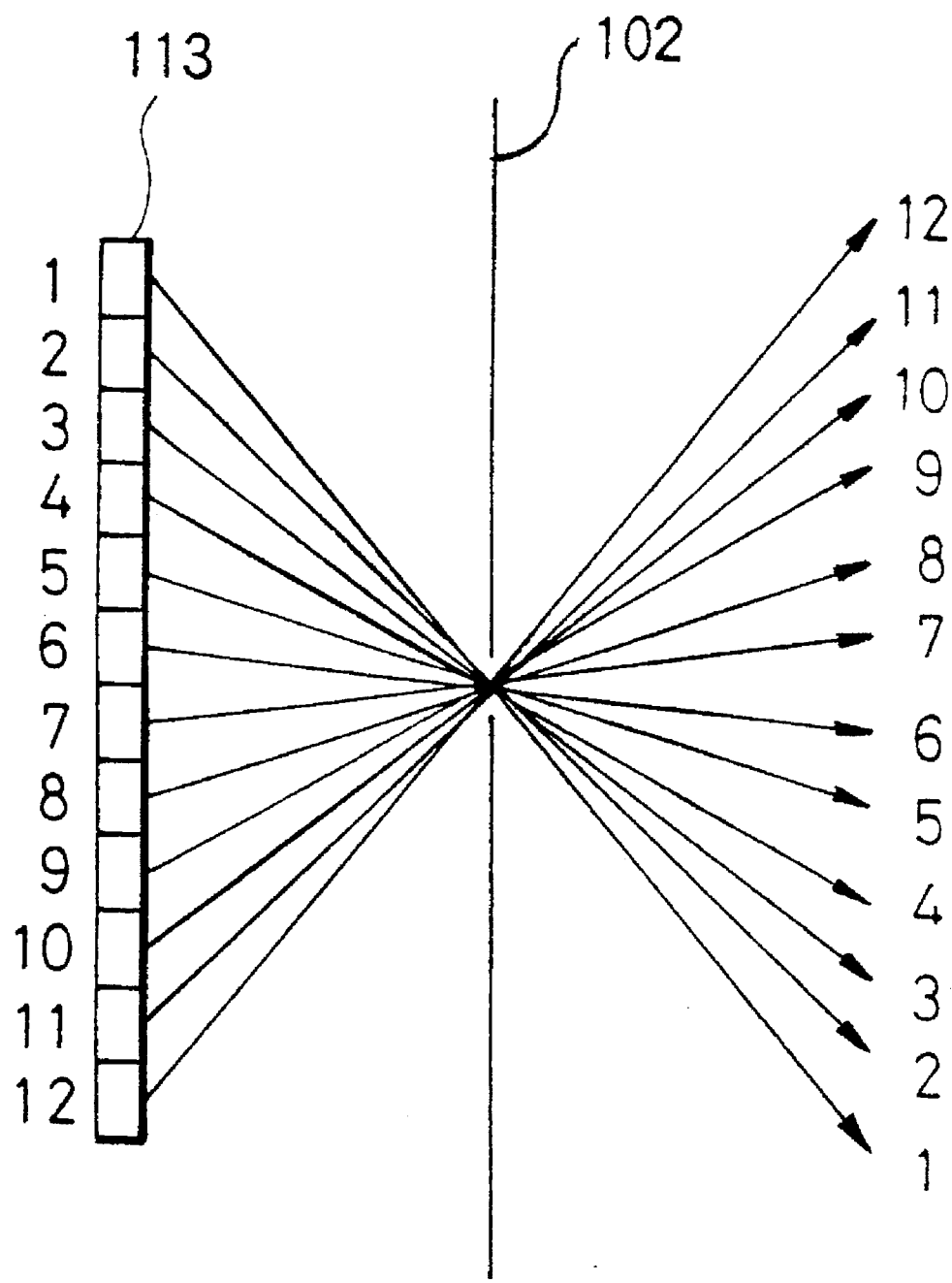
FIG. 33 is a diagram showing the angle of a beam of light that is reproduced in the embodiment of FIG. 30.

Next, the display operation of this embodiment will be described making reference to the drawings. In the three-dimensional information reproducing apparatus shown in FIG. 30, a color is displayed with time division, so the display liquid crystal panel 113 uses a liquid crystal panel which is not provided with a color filter such as that shown in FIG. 32. Therefore, a portion, which is used as the subpixel of the pixel of the liquid crystal panel of the above-described conventional apparatus, can be used as one independent display pixel 124. As a result, as compared with the conventional apparatus, the image which is displayed on the liquid crystal panel 113 has three times as much resolution in the horizontal direction. For example, it is assumed that, in the conventional apparatus, 16 pixels of 4×4 are assigned to one pinhole. When a liquid crystal panel 113 such as that shown in FIG. 32 is employed, 48 pixels of 12×4 can be assigned to one pinhole without changing the pinhole array panel. At this time, since a color is displayed with time division, the light beams from 12 pixels in the horizontal direction pass through the pinhole and then travel in the respective directions, as shown in FIG. 33, and the resolution of the angle of a reproduced light beam becomes three times as high as the conventional apparatus.

Figure 4:
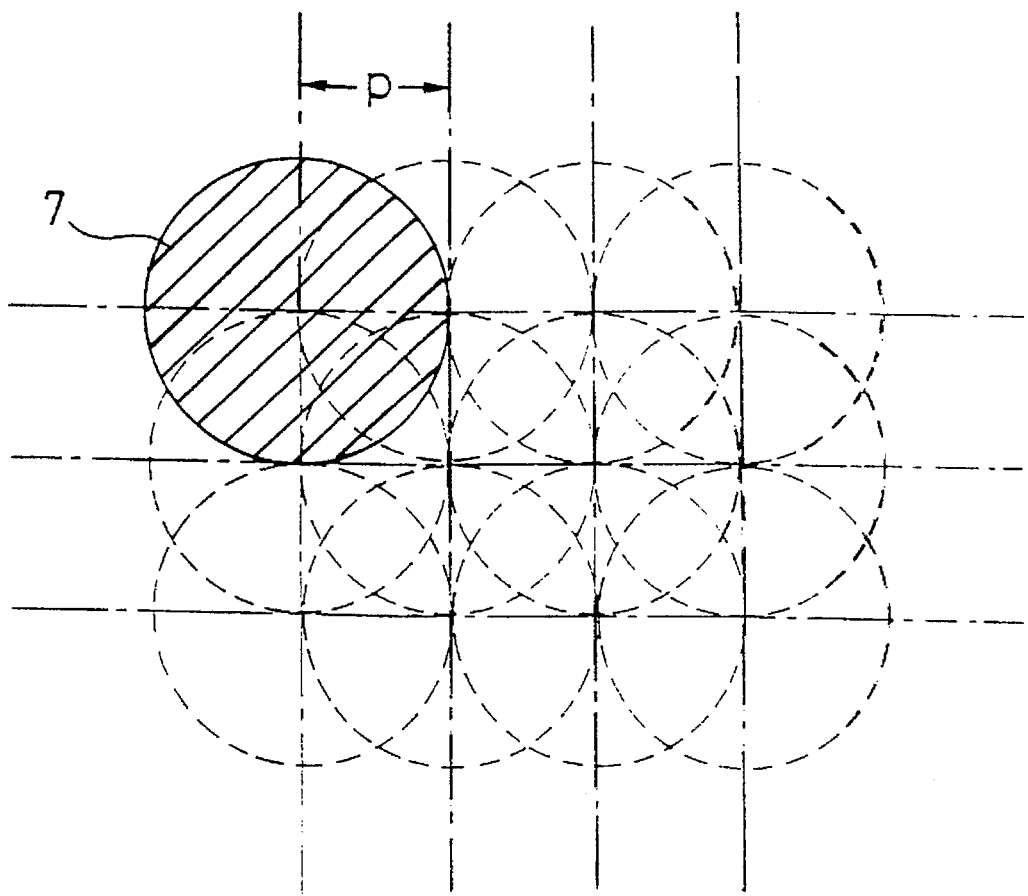
FIG. 4 is a diagram used to explain an input method of three-dimensional information.
Figure 5:
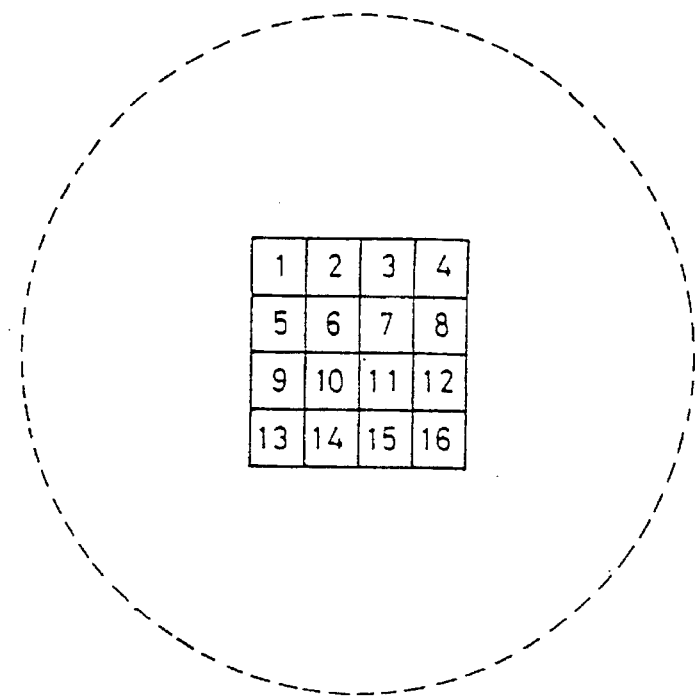
FIG. 5 is a diagram showing 4×4 pixels corresponding to one pinhole of FIG. 3.
Figure 6:
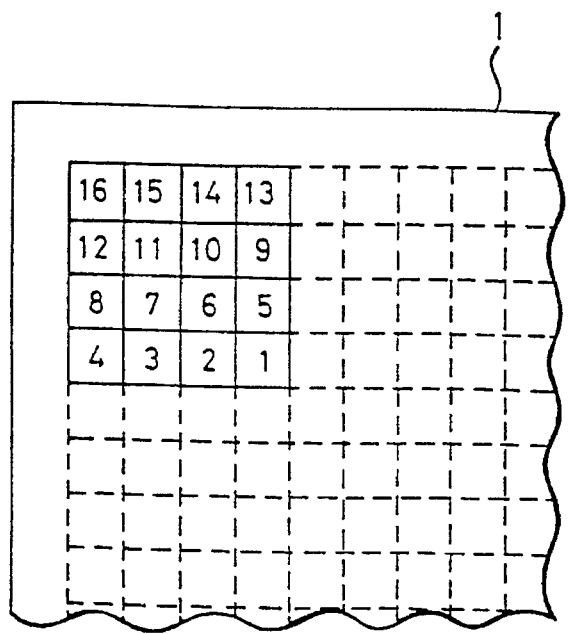
FIG. 6 is a diagram showing an example of the pixels of FIG. 5 rearranged at the time of reproduction.
Figure 7A:
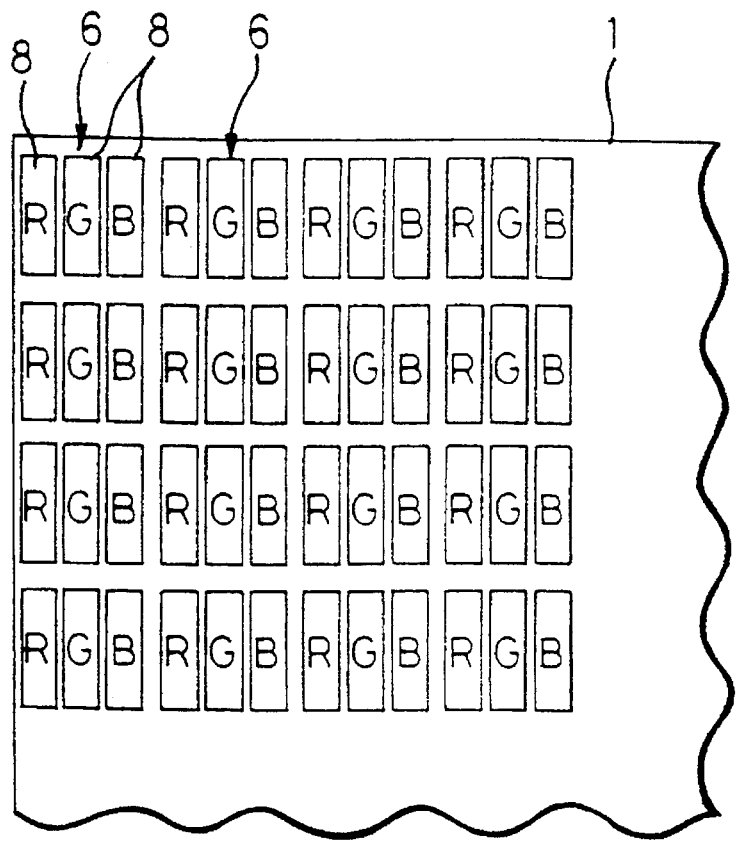
Figs. 7A and 7B are diagrams showing the constitution of pixels of a conventional liquid crystal panel.
Figure 7B:
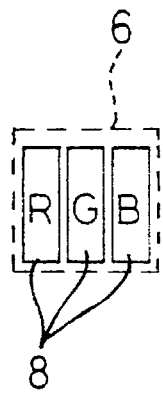
Figure 8A:
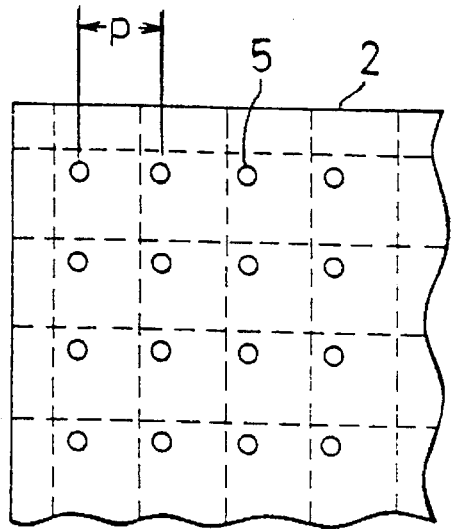
FIGS. 8A to 8D are diagrams showing an example of the position of a pinhole array varied with time.
Figure 8B:
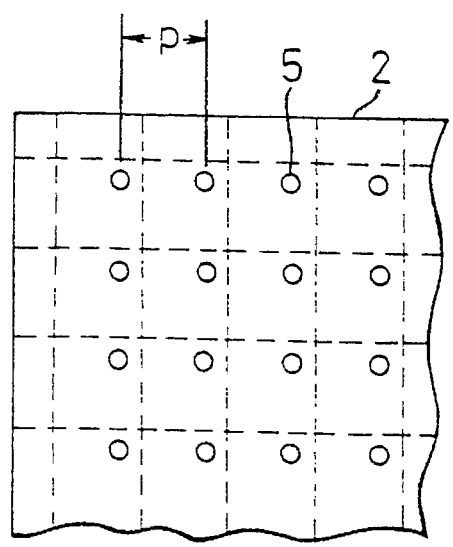
Figure 8C:
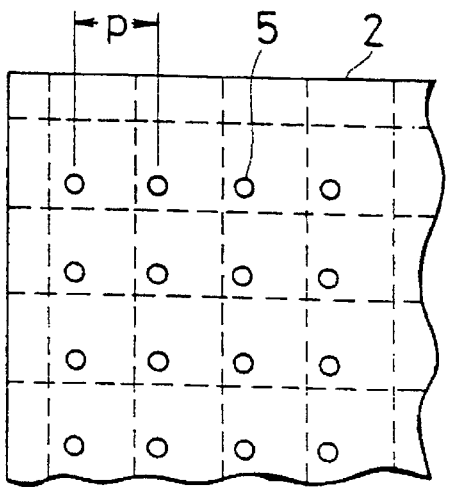
Figure 8D:
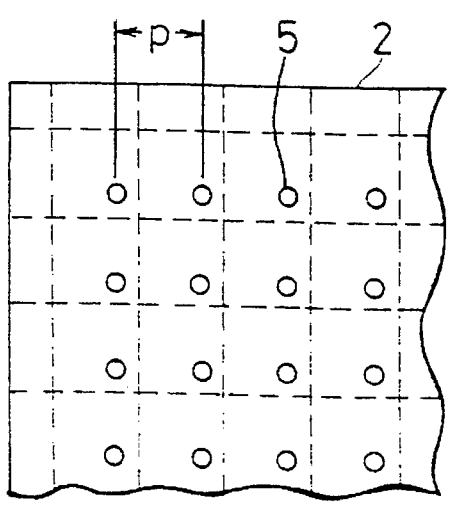
Figure 9B:
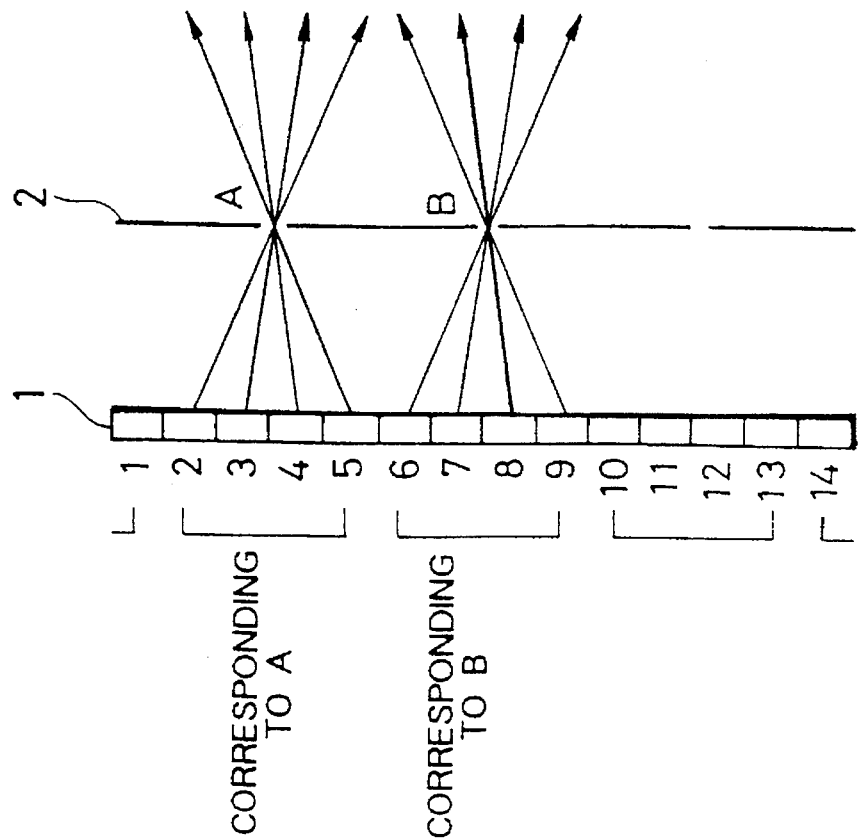
FIGS. 9A and 9B are diagrams used to explain the reproduction of beams of light as the position of the pinhole array was varied with time.
Figure 9A:
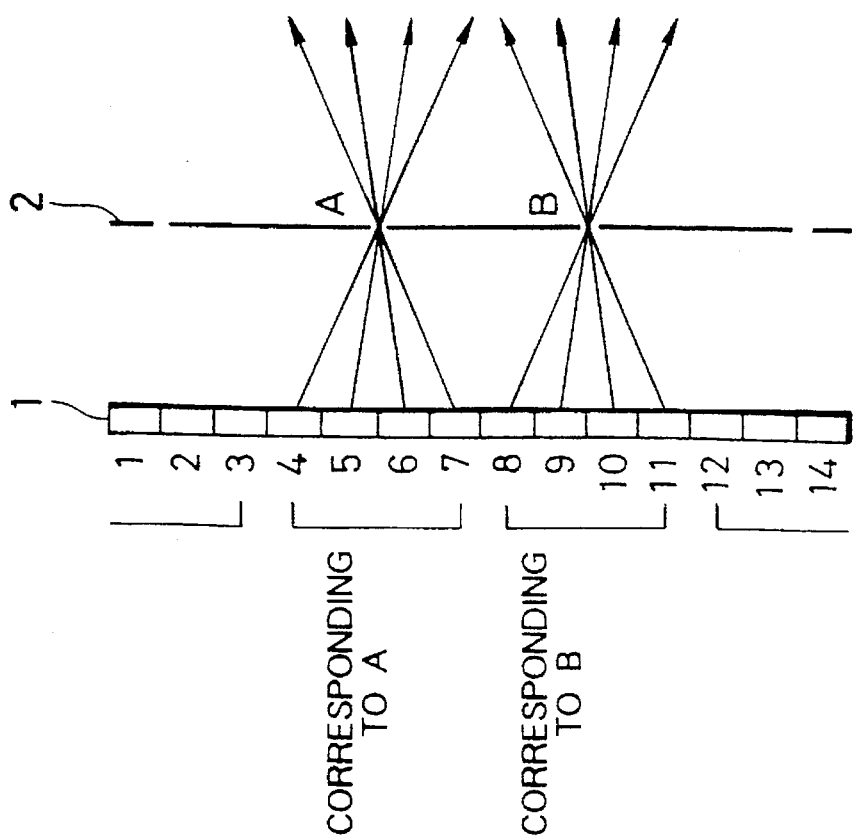
Figure 10:
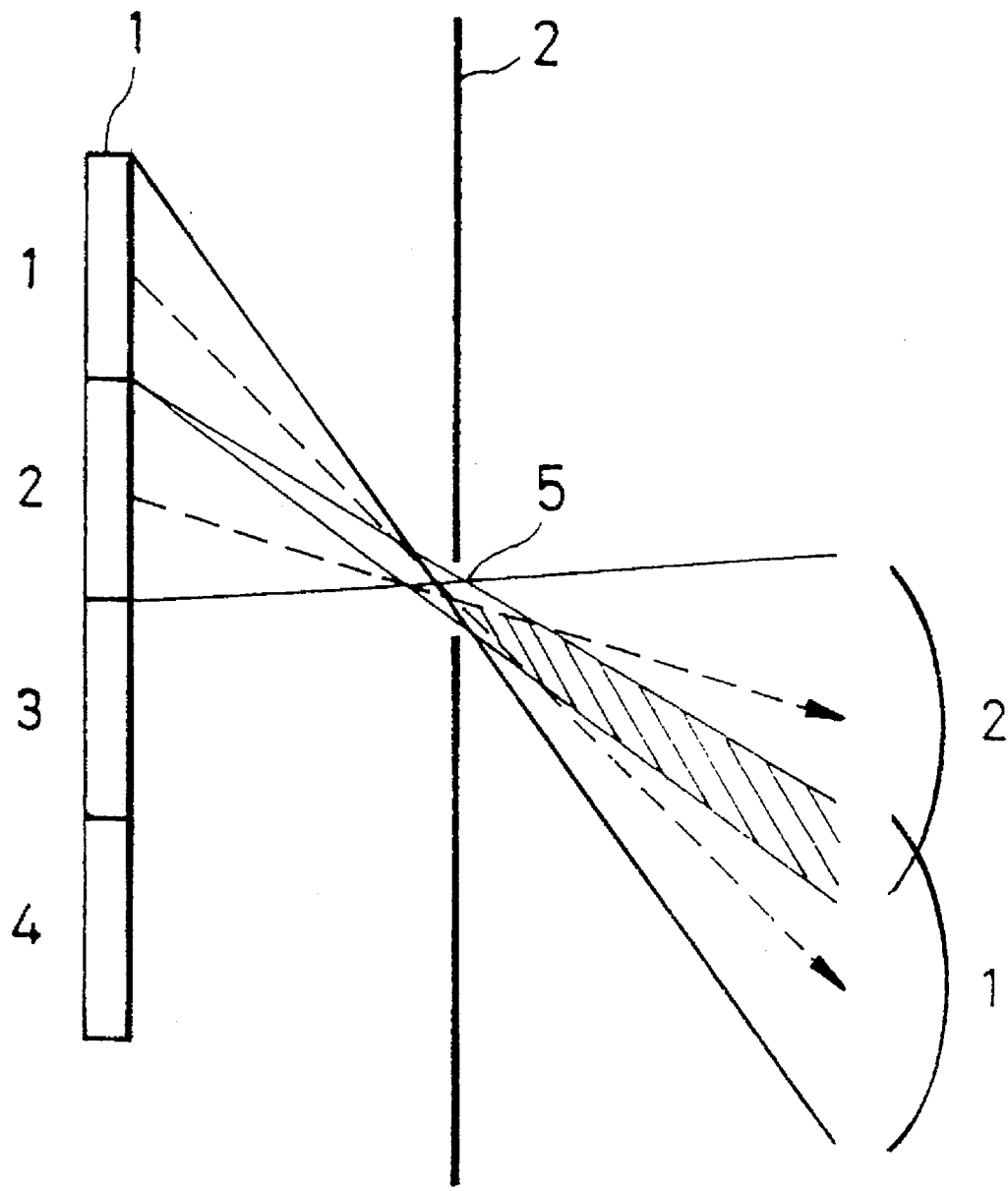
FIG. 10 is a diagram showing the cross talk of a conventional three-dimensional information reproducing apparatus.
Figures 34, 35:
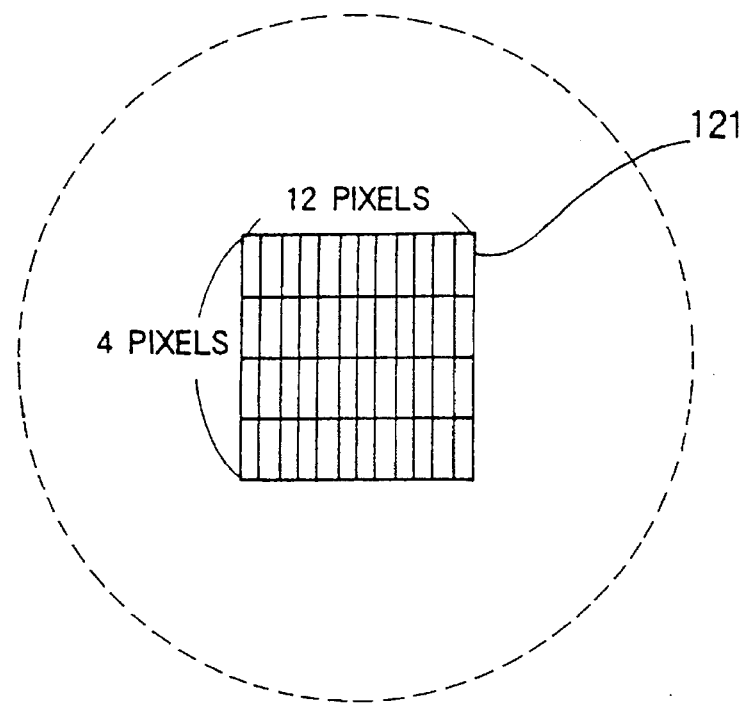
FIG. 34 is a diagram showing a partial image corresponding to one pinhole of the embodiment of FIG. 30.
FIG. 35 is a diagram showing the pixel arrangement of the partial image of the FIG. 34.
Figure 36:
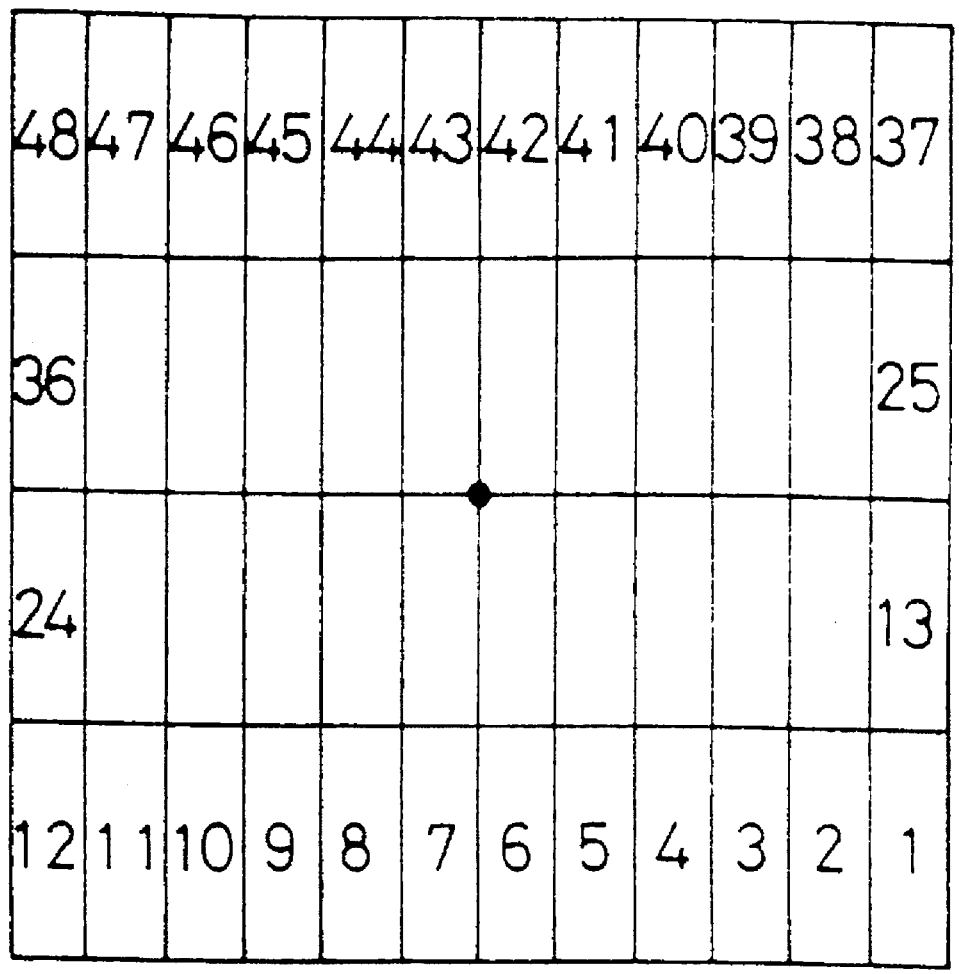
FIG. 36 is a diagram showing an example of the partial image of FIG. 35 rearranged at the time of reproduction.

When 48 pixels of 12×4 on the liquid crystal panel are assigned to one pinhole, only 48 pixels of 12×4 in the central portion become necessary, as shown in FIG. 34, for a partial image that is obtained with a camera placed in the pinhole position shown in FIG. 4 by the above-described three-dimensional information reproducing apparatus. If the 48 pixels photographed are numbered from 1 to 48, as shown in FIG. 35, they will need to be so rearranged as to become point-symmetrical with respect to the position of the pinhole, as shown in FIG. 36, in order to display the image photographed on the display panel 13 of the three-dimensional information reproducing apparatus in FIG. 30. The reason is because if displaying is performed with a pixel arrangement such as that shown in FIG. 35, an image in which the depth side and this side are inverted in the depth direction will be reproduced. The right image can be observed by this rearrangement. This rearranging process is performed for each photographic position of the camera, i.e., the pinhole position. By arranging the rearranged partial images in the positions corresponding to the pinholes, there is obtained a synthesized image of one picture screen that is displayed on the liquid crystal panel 113 of the above-described reproducing apparatus.

Figure 37:
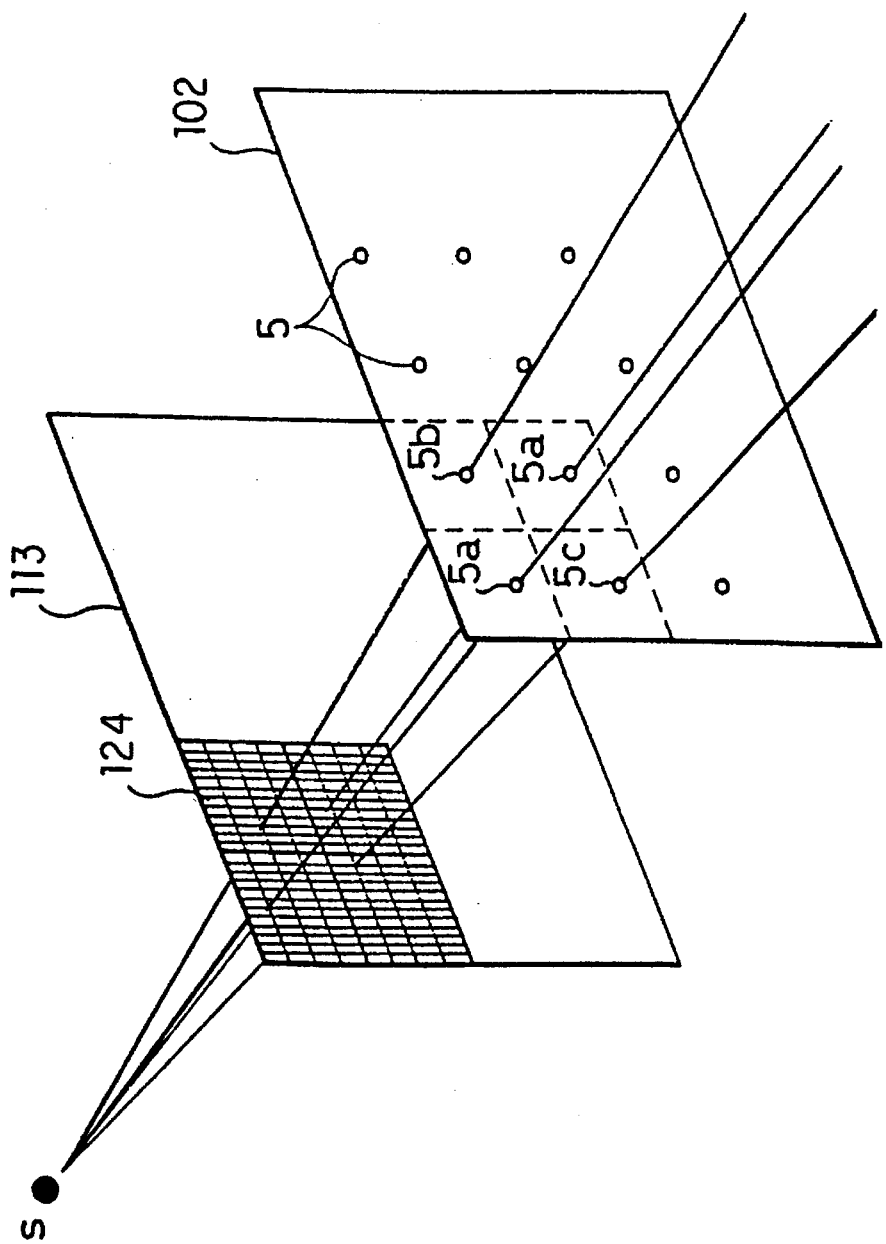
FIG. 37 is a diagram used to explain the principles of the reproduction of a three-dimensional image in the three-dimensional information reproducing apparatus of FIG. 30.

The reproduction of the Fourier transform image in this embodiment will hereinafter be described making reference to FIG. 37. In the figure, a pixel block 124 of 12×4 (=48) pixels on the liquid crystal panel is assigned to each of the pinholes 5a, 5b, 5c . . . on the pinhole array panel 102. Part of light radiated from some pixel block 124 on the liquid crystal panel 113 travels in a direction that is determined by the spatial position of the pinhole 5 corresponding to that pixel block 124. Light beams in various directions are reproduced by a combination of the pixel block 124 and the position of the pinhole 5. As a result, a spatial image is formed in an observation space by a group of light beams emitted From a plurality of pinholes 5. In the example of FIG. 37, light beams radiated from an object S in plural directions have been reproduced. The light from the object S is originally scattered in all directions, and the pinhole 5 has a function of sampling the light scattering from the object S in all directions. Therefore, if the number of the pinholes 5 are increased, the reproducibility of light beams will be increased. A continuous body to be photographed can be reproduced by arranging a plurality of the pinholes 5.

If an observer perceives a light beam emitted from the pinhole 5 by his or her eyes, three-dimensional information of the object S will be recognized and the object S is recognized as a three-dimensional image. In such a three-dimensional information reproducing apparatus of the type in which a light-beam state such is reproduced, special spectacles are unnecessary, the observation position is not limited extremely like a so-called lenticular method, and a plurality of people can observe a reproduced picture image at the same time. If a visual point is moved, then an image that is observed will be changed according to the movement of the visual point. The factor that recognizes a reproduced picture image as a three-dimensional image is not only binocular parallax, but also the factor is that the distance feeling of a reproduced picture image, i.e., three-dimensional feeling is recognized by the focussing function of eyes. Therefore, there is a little fatigue feeling at the time of observation, a more natural three-dimensional image can be observed, and three-dimensional information can be recognized even by one eye.

As described above, according to the three-dimensional information reproducing apparatus of this embodiment, the discrete Fourier transform image resolved into color components is displayed with time division by the image display means, the emitted light whose color varies with time division is radiated to the above-described image display means by the illumination means, and the display image resolved into color components that is displayed on the image display means and the color of the illumination light that is radiated from the illumination means are synchronized and switched by the synchronous control means. A space image is formed by reproducing the discrete Fourier transform image by the optical means. Since the discrete Fourier transform image is resolved into color components and displayed, no color dislocation occurs in the reproduced image. The display image resolved into color components and the color of the illumination light are synchronized and switched, so the resolution of the reproduced image is enhanced and also a light image can be obtained. In addition, since the optical means comprises a two-dimensional pinhole array, the manufacture and installation of the optical means become easy.

Figure 38:
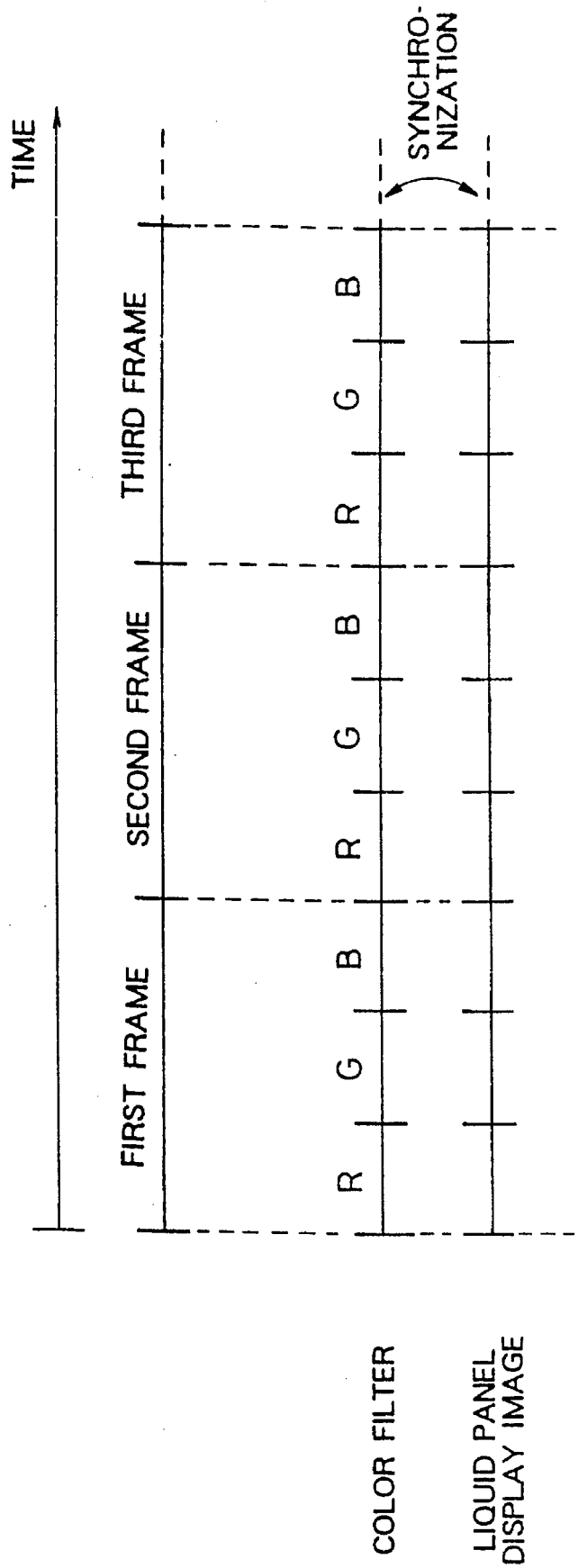
FIG. 38 is a diagram used to explain the color reproduction of the embodiment of FIG. 30.

The color reproduction in this embodiment will hereinafter be described making reference to FIG. 38. As shown in FIG. 32, the liquid crystal panel 113 used in this embodiment is a monochromatic panel that is not provided with color filters, so only a monochromatic image with no color can be displayed and a color cannot be reproduced without changes. Then, color display is performed by displaying each image of R, G, and B with time division. An interval corresponding to one frame of a conventional apparatus is divided into three parts as shown in FIG. 38, and a monochromatic image for R, a monochromatic image for G, and a monochromatic image for B are displayed in order on the monochromatic liquid crystal panel 113 at the divided intervals. In synchronization with the monochromatic image for R, the monochromatic image for G, and the monochromatic image For B displayed on the liquid crystal panel 113, the motor 117 is rotated and controlled by the synchronous control means 115, and the rotary color filter 116 changes into red, green, and blue the color of light that is radiated from the white light source 104 to the back surface of the liquid crystal panel 113. For example, if it is assumed that the frame cycle is 1/30 sec, the motor 117 will be rotated and controlled by the synchronous control means 115 so that the rotary color filter 116 makes one revolution for 1/30 sec. The synchronous control means 115 switches each monochromatic image that is displayed on the liquid crystal panel 113 every 1/90 sec. The switching of each monochromatic image may be performed at a unit of field. In such case, each monochromatic image is switched every 1/180 sec and at the same time the rotational cycle of the rotary color filter 116 is set to 1/60 sec.

Thus, in this embodiment the illumination means is constituted by the rotary color filter and the white light source, so a color image can be simply reproduced and the manufacture and installation of the illumination means become easy.

Figure 39:
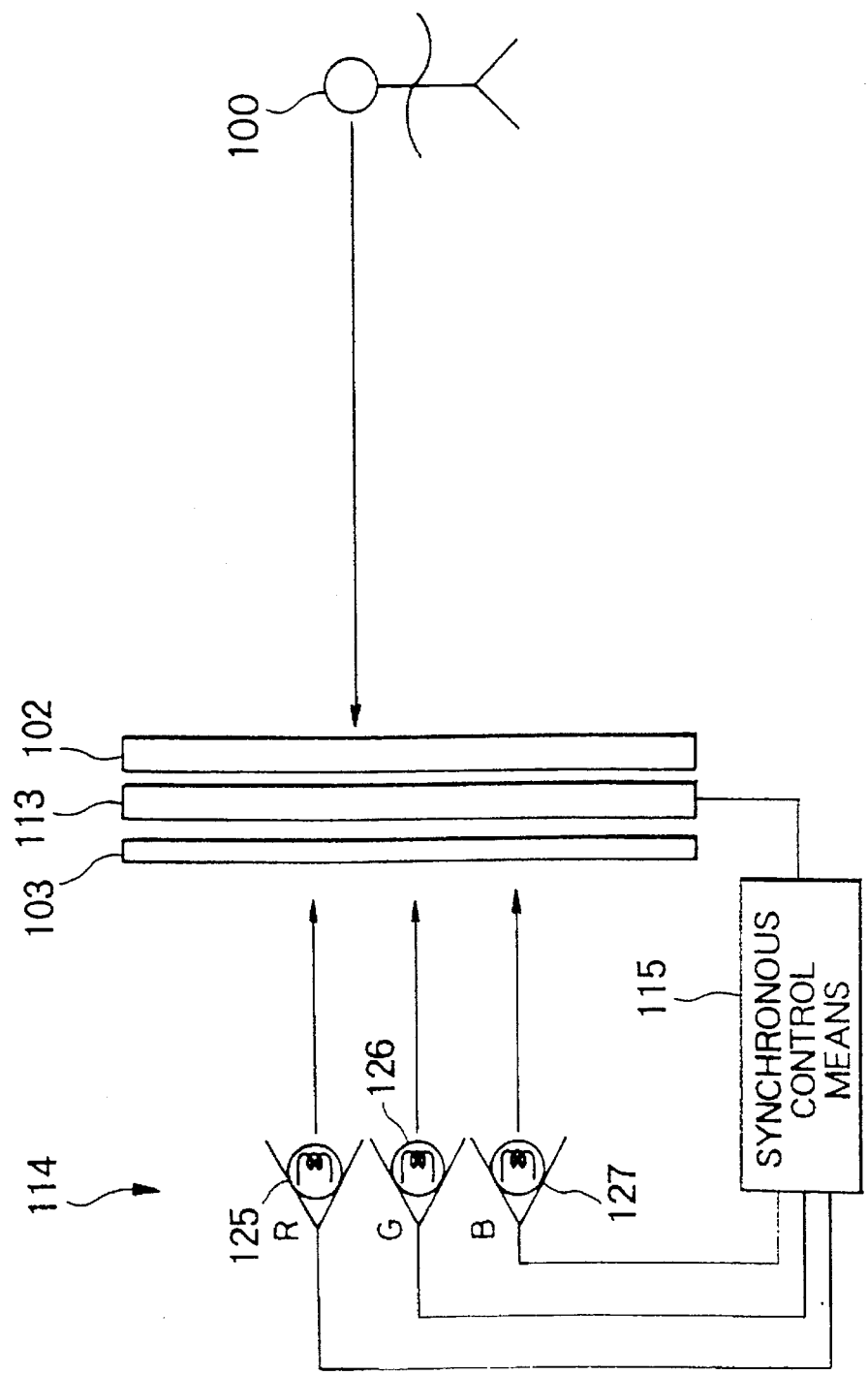
FIG. 39 is a diagram used to explain a sixth embodiment of the three-dimensional information reproducing apparatus of the present invention.

A sixth embodiment of the three-dimensional information reproducing apparatus of the present invention will hereinafter be described making reference to FIG. 39. A liquid crystal panel 113, a pinhole array panel 102, and a diffusion plate 103 shown herein are identical with corresponding parts of the three-dimensional information reproducing apparatus shown in FIG. 30 to which the same reference numerals are applied.

Illumination means 14 of this embodiment comprises a red light source 125, a green light source 126, and a blue light source 127, which are lit and controlled by synchronous control means 115. As a display liquid crystal panel, there is employed a liquid crystal panel 113 such as the one shown in FIG. 32, which is not provided with color filters. Color display is performed by displaying each image of R, G, and B with time division. In FIG. 39, in synchronization with the monochromatic image for R, the monochromatic image for G, and the monochromatic image for B that are displayed on the monochromatic liquid crystal panel 113 in order, the light sources 125, 126, and 127 are lit and controlled by the synchronous control means 115, so that the color of light that is radiated from the back surface of the liquid crystal panel 113 is changed into red, green, and blue. For example, if it is assumed that the frame cycle is 1/30 sec, the sources will be switched every 1/30 sec by the synchronous control means 115. Each monochromatic image that is displayed on the liquid crystal panel 113 is switched every 1/90 sec by the synchronous control means 115.

Thus, in this embodiment the illumination means is constituted by the three color sources, so a color image can be simply reproduced and also the manufacture and installation of the illumination means become easy.

Figure 40:
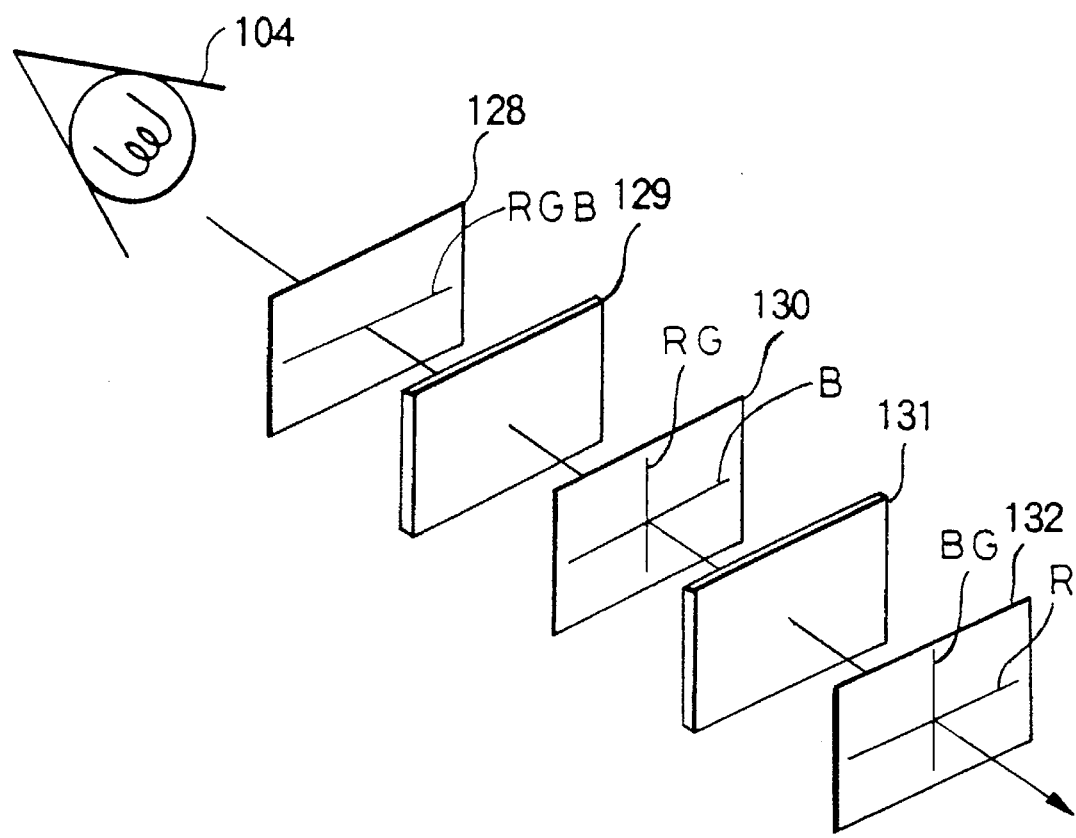
FIG. 40 is a diagram used to explain a seventh embodiment of the three-dimensional information reproducing apparatus of the present invention.

A seventh embodiment of the three-dimensional information reproducing apparatus of the present invention will hereinafter be described making reference to FIG. 40. The basic constitution of the three-dimensional information reproducing apparatus of this embodiment is identical with the sixth embodiment shown in FIG. 39 and therefore comprises a liquid crystal panel 113, a pinhole array panel 102, and a diffusion plate 103, but the constitution of illumination means 114 is different.

The illumination means 114 of this embodiment is constituted by a white light source 104, three polarizing plates 128, 130, and 132, and two liquid crystal panels 129 and 131. The polarizing plates 128, 130, and 132 are called a polychromatic polarizing plate, which can change the color of transmitted light according to a polarizing angle. The symbols R, G, and B shown in the polarizing plates 128, 130, and 132 in FIG. 40 represent a polarizing angle, i.e., the color of horizontal or vertical light as it passes through the polarizing plates 128, 130, and 132. Since the light incident upon the liquid crystal panels 129 and 131 passes through without changing the polarizing angle, when they are in an on state, and the polarizing angle is twisted 90 degrees when they are in an off state, the color of the transmitted light can be switched to three primary colors by combining the on-off state of each of the liquid crystal panels, as shown in Table 3.

TABLE 3

| Liquid crystal panel 129 | Liquid crystal panel 131 | Color |
| --- | --- | --- |
| On | Off | B |
| Off | On | G |
| Off | Off | R |

For example, when the liquid crystal panel 129 is on and the liquid crystal panel 131 is off, the white light emitted from the white light source 104 contains red light R, green light G, and blue light B, and is horizontally polarized when passing through the polarizing plate 128. The horizontal light that passed through the polarizing plate 128 passes through the liquid crystal panel 129 without being changed, because the liquid crystal panel 129 is in the on state. The horizontal light that passed through the liquid crystal panel 129 is input to the polarizing plate 130, and only the blue light B passes through by the polarizing plate 130. The polarizing angle of the horizontal blue light B that passed through the polarizing plate 130 is twisted 90 degrees, because the liquid crystal panel 131 is in the on state, and then the horizontal blue light B becomes substantially vertical and passes through the polarizing plate 132. Likewise, when the liquid crystal panel 129 is in the on state and the liquid crystal panel 131 is in the on state, only the green light G passes through the polarizing plate 132. When both the liquid crystal panel 129 and the liquid crystal panel 131 are in the off state, only the red light R passes through the polarizing plate 132. Therefore, by the synchronous control means 115, the color of transmitted light can be switched by switching the on-off states of the liquid crystal panels 129 and 131 and also colors can be displayed by synchronizing the monochromatic display picture screen of the display panel 113.

Thus, in this embodiment the illumination means is constituted by the liquid crystal panel, the polarizing plate and the white light source, so color images can be simply reproduced and the illumination means can be made thin.

Figure 41:
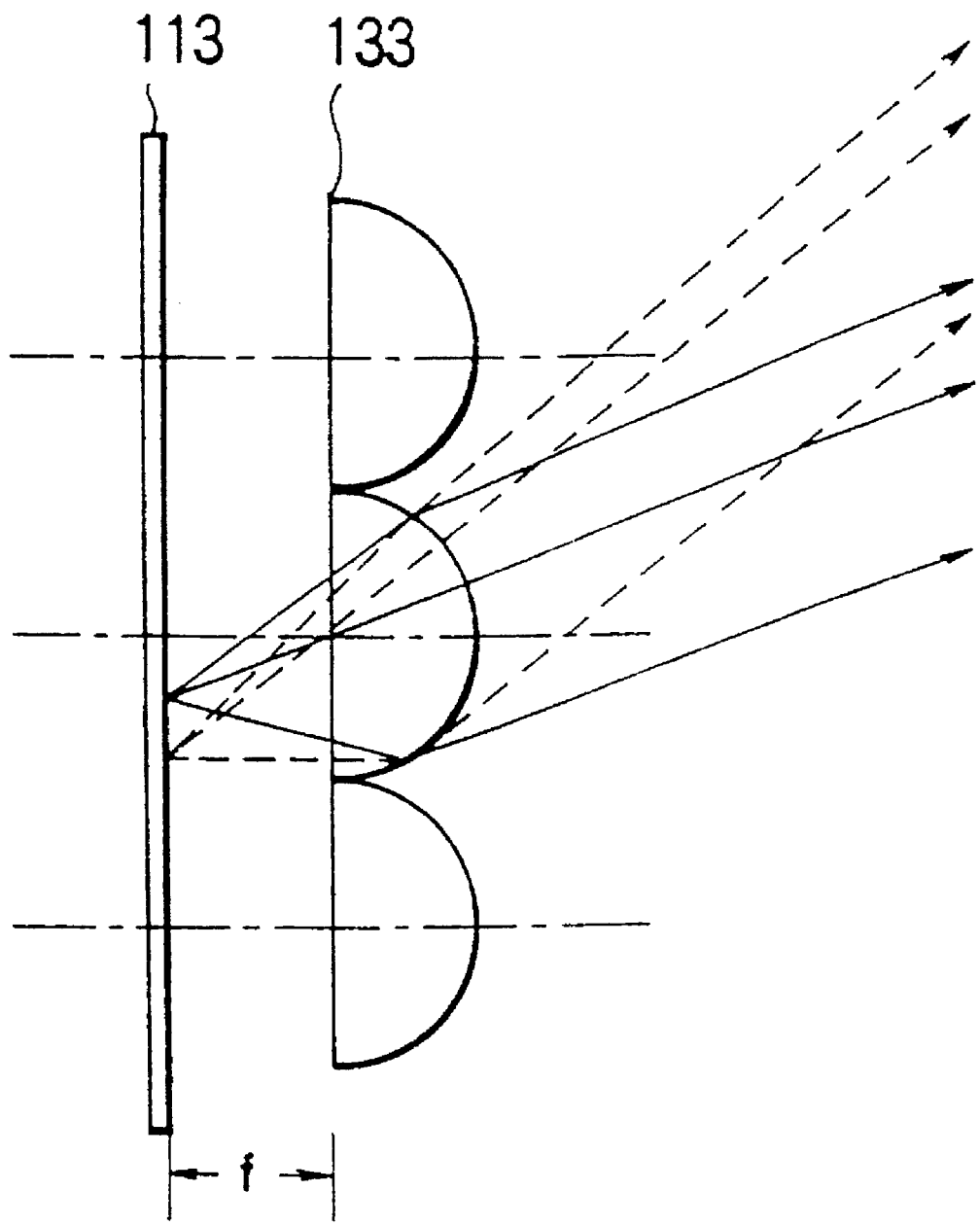
FIG. 41 is a diagram used to explain the case that a two-dimensional lens array was used in the embodiment of FIG. 40.

While, in the above-described fifth to seventh embodiments 5 to 7, a plurality of pinholes having Fourier transform operation have been bored two-dimensionally and arranged in the pinhole array panel 102 disposed to the front of the liquid crystal panel 113 of the three-dimensional information reproducing apparatus, a two-dimensional lens array (such as 20 in FIG. 14) may be used instead of the panel 102. While, in the three-dimensional information reproducing apparatus described in FIG. 13, light travels from left to right, in this embodiment light travels from right to left. For this reason, a lens emits light at an angle which corresponds to the dislocation of a Fourier transform image from the optic axis. Therefore, the discrete Fourier transform image can be reproduced by arranging a two-dimensional lens array 133 to the front of the liquid crystal panel 113, as shown in FIG. 41. The space between the liquid crystal panel 113 and the above-described lens array 133 must be equal to the focal distance f of the lens array 133. Since the pinhole array panel 102 shades most of light emitted from the liquid crystal panel 113, a reproduced image that is obtained becomes dark, but in this embodiment a light reproduced image is obtained by effectively utilizing light by the two-dimensional lens array 133. When colors are displayed, the illumination means is controlled by the synchronous control means 115 in synchronization with a monochromatic image for R, a monochromatic image for G, and a monochromatic image for B that are displayed in order on the monochromatic liquid crystal panel 113, so that the color of light which is emitted from the back surface of the liquid panel 113 can be changed to red, green, and blue.

A modification of the present invention will hereinafter be described making reference to FIG. 23 described above.

While in the above-described embodiments the discrete Fourier transform images had been sampled in the horizontal and vertical directions and the optical means used in the image reproduction had been the pinhole array panel 102 or two-dimensional lens array 133, the reproduced image had parallax in the horizontal and vertical directions. However, photographing has to be performed for each pinhole position or lens position and the operation is complicated, so there is a simple method in which slits are used in optical means. Discrete Fourier transform images to be recorded are sampled only in the horizontal direction, and for the vertical direction, they are continuously recorded. One-dimensional sampling only in the horizontal direction can be performed by using a slit array panel 23 such as the one shown in FIG. 23. In the panel 23 there are bored a plurality of elongated slits 24 at pitch-p intervals in the vertical direction. For example, in reproducing an input three-dimensional image, in the three-dimensional information reproducing apparatus shown in FIG. 30 the pinhole array panel 102 is replaced with the slit array panel 23 shown in FIG. 23. A three-dimensional image that is reproduced has parallax only in the horizontal direction, so an image that is observed would not change even if a visual point were moved in the vertical direction. But, the vertical resolution becomes high, so there is obtained a visually clear image.

Also, instead of the slit array panel 23, a one-dimensional array of cylindrical lenses, i.e., a lenticular lens may be used. When the lenticular lens is employed, it has the advantage that a reproduced image becomes lighter, in addition to the effect of the case where the slit array panel 23 is employed. Further, the lenticular lens is easy in manufacture and installation, as compared with the two-dimensional lens array 133.

An eighth embodiment of the three-dimensional information reproducing apparatus of the present invention will hereinafter be described making reference to the drawings.

The three-dimensional information reproducing apparatus of this embodiment will be described with FIG. 42. In the three-dimensional information reproducing apparatus of this embodiment, a cylindrical lens 203 with a curvature in the horizontal direction is disposed to the rear of a liquid crystal panel 202 with no color filters, and optical fibers 207 are disposed to the rear of the lens 203. The light emitted from the light source 206 is narrowed by a convex lens 205, passes through a rotational color filter 204, and then is guided to the optical fibers 207.

One end faces of the optical fibers 207 are arranged on a plane (plane A) which is away from the rear of the cylindrical lens 203 by the focal distance f, and serve as a light source array of the liquid crystal panel 202. In FIG. 42 there is shown an example of a case where a light source array comprising four light sources #1 to #4 is formed with four optical fibers.

The feature of this embodiment is in that the colors of the light beams which are emitted from the end faces of the optical fibers on the plane A are switched with time division, so a detailed description will be given in this respect.

Figure 42:
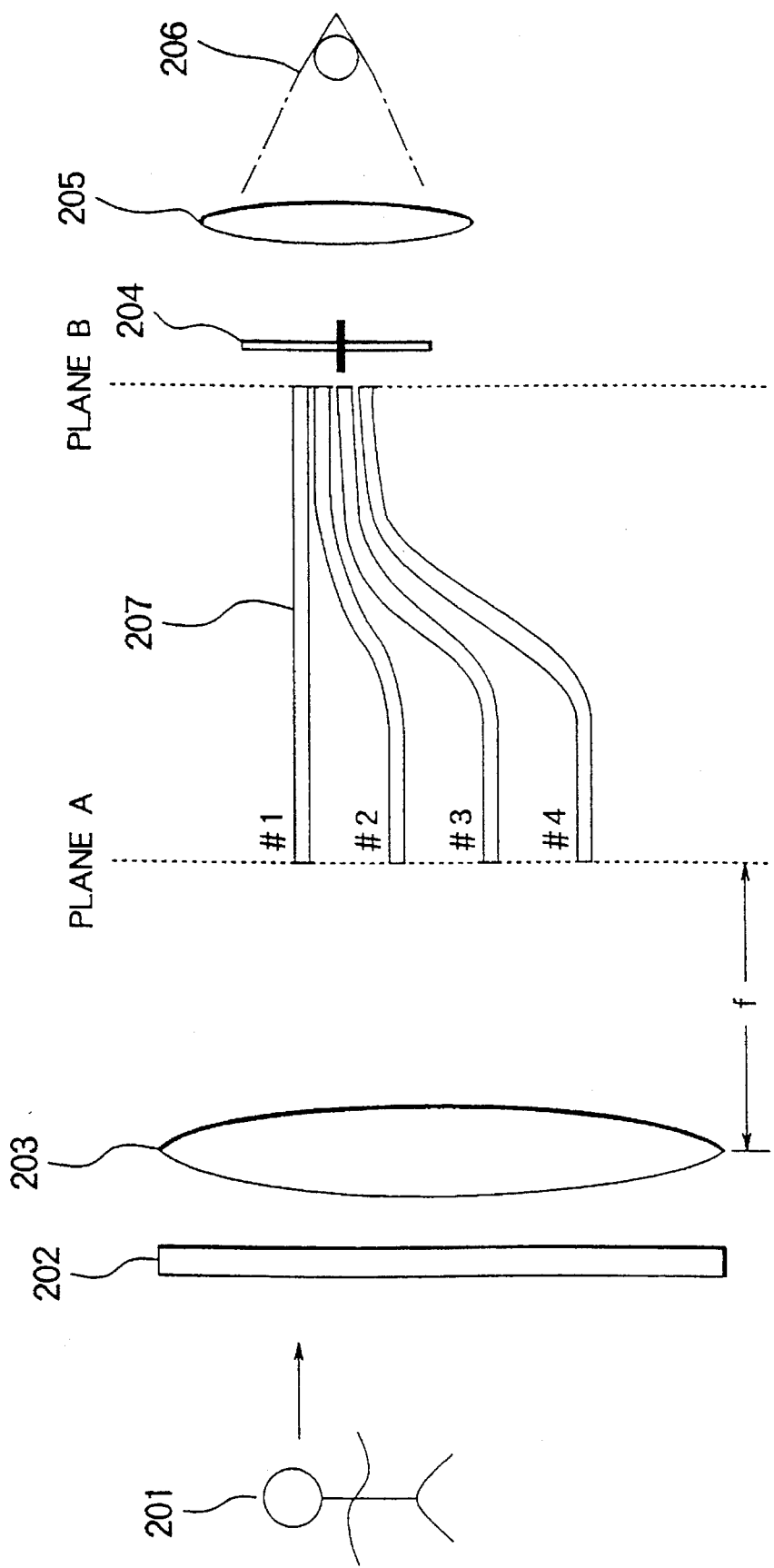
FIG. 42 is a diagram used to explain an eighth embodiment of the three-dimensional information reproducing apparatus of the present invention.

The structure of the rotational color filter 204 used in the case of FIG. 42 where four optical fibers are employed is shown in FIG. 43. The rotational color filter 204 is divided into 12 equal parts, and the three fan-shaped parts are a red color filter 211, a green color filter 212, and a blue color filter 213, respectively, and the remaining part is a non-transmission portion 210. In general, when n optical fibers are used, a rotational color filter can be constructed such that a circle is divided into (n×3) equal parts, the three fan-shaped parts are a red color filter, a green color filter, and a blue color filter, respectively, and the remaining part is a non-transmission portion.

Next, a method for arranging optical fibers 207 will be described with FIG. 44. In the figure, the rotational color filter shown in FIG. 43 is indicated by dotted lines in FIG. 44. The other end faces of the optical fibers 207 (on plane B) are so arranged as to correspond to the rotational color filter 204, as shown in FIG. 44. That is to say, four optical fibers are arranged at equal intervals, and each fiber is disposed so as not to be greater than the equally 12-divided fan shape. Note that light is effectively guided into the optical fiber by attaching lenses to the end faces of the optical fibers 207 on the plane B.

In such arrangement, the light narrowed to the extent of the area of the rotational color filter 204 by the lens 205 is guided to the color filter from the rear of the color filter, as shown in FIG. 42, and if the rotational color filter 204 is rotated, the light that is emitted from the end faces of the optical fibers 207 on the plane A will be varied with time, as shown in FIG. 45. At a certain time, only one among four optical fibers is shining and, on top of that, the color is a monochromatic color of either R, G or B. By rotation of the rotational color filter 204, that change is periodically changed with 12 steps as one cycle. By changing an image that is displayed on the liquid crystal panel 202 in synchronization with rotation of the rotational color filter 204, the state of a light beam as it was recorded can be reproduced and a space image can be formed.

In this embodiment, the angle of back-surface illumination light varies with time and the color also varies with time, so dimness or cross talk does not occur, and on top of that, there can be reproduced a three-dimensional image in which there is no color dislocation and which is high in resolution.

Many widely different embodiments of the present invention may be constructed without departing from the spirit and scope of the present invention. It should be understood that the present invention is not limited to the specific embodiments described in the specification, except as defined in the appended claims.

What is claimed is:

1. A three-dimensional information reproducing apparatus comprising:

image display means for displaying three monochromic images with time division, each of said three monochromic images being divided from a discrete Fourier transform image in accordance with three primary colors, respectively;

optical means disposed to the front of said image display means for performing a discrete Fourier transform at least in a horizontal direction;

illumination means disposed to the rear of said image display means for radiating emitted light having color changing with time division to said image display means; and synchronous control means connected to said image display means and said illumination means for switching a color of illumination light radiated from said illumination means and one of said three monochromic images displayed by said image display means, synchronously.

2. The three-dimensional information reproducing apparatus as set forth in claim 1, wherein said optical means includes a two-dimensional array of pinholes.

3. The three-dimensional information reproducing apparatus as set forth in claim 1, wherein said optical means includes a two-dimensional lens array.

4. The three-dimensional information reproducing apparatus as set forth in claim 1, wherein said optical means includes a one-dimensional array of slits.

5. The three-dimensional information reproducing apparatus as set forth in claim 1, wherein said optical means includes a one-dimensional array of cylindrical lens.

6. The three-dimensional information reproducing apparatus as set forth in claim 1, wherein said illumination means includes a rotational color filter and a white light source.

7. The three-dimensional information reproducing apparatus as set forth in claim 1, wherein said illumination means includes three light sources of three colors.

8. The three-dimensional information reproducing apparatus as set forth in claim 1, wherein said illumination means includes a liquid crystal panel, a polarizing plate, and a white light source.

9. A three-dimensional information reproducing apparatus comprising:

a plurality of image display means each for displaying a discrete Fourier transform image with time division;

a plurality of illumination means each disposed to the rear of one of said image display means for emitting parallel light to said one of image display means;

image combining means for combining discrete Fourier transform images each displayed by one of said plurality of image display means, so as to form one discrete Fourier transform image; and synchronous control means for switching with time division, said discrete Fourier transform images displayed in said plurality of image display means and angles of said parallel light each emitted from one of said plurality of illumination means, synchronously.

10. The three-dimensional information reproducing apparatus as set forth in claim 9, wherein each of said illumination means includes a light source array having a plurality of light sources for emitting light, and a lens for transforming said light emitted from said light source array into parallel light.

11. The three-dimensional information apparatus as set forth in claim 9, wherein each of said illumination means includes a light source for emitting a light, a light source moving means for moving said light source in a right-angle direction with respect to an optic axis, and a lens for transforming said light emitted from said light source into parallel light.

12. The three-dimensional information apparatus as set forth in claim 9, wherein each of said illumination means includes a light source array having a plurality of light sources for emitting light, light source array moving means for moving said light source array in a right-angle direction with respect to an optic axis, and a lens array consisting of a plurality of lenses for transforming said light emitted from said light source array into a parallel light.

13. The three-dimensional information apparatus as set forth in claim 9, wherein said plurality of image display means includes two image display means, and said plurality of illumination means includes two illumination means.

\* \* \* \* \*